United States Patent
Mori et al.

(10) Patent No.: US 8,153,283 B2
(45) Date of Patent: *Apr. 10, 2012

(54) MAGNETIC RECORDING MEDIUM, METHOD OF MODIFYING SURFACE OF MAGNETIC POWDER AND MAGNETIC COATING MATERIAL

(75) Inventors: Masahiko Mori, Kanagawa (JP); Kazufumi Omura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 12/413,956

(22) Filed: Mar. 30, 2009

(65) Prior Publication Data

US 2009/0246560 A1   Oct. 1, 2009

(30) Foreign Application Priority Data

Mar. 31, 2008  (JP) .................................. 2008-090720

(51) Int. Cl.
    *G11B 5/708* (2006.01)
(52) U.S. Cl. ...................................................... 428/843
(58) Field of Classification Search ..... 428/844.5–844.9
    See application file for complete search history.

(56) References Cited

U.S. PATENT DOCUMENTS

| 3,084,187 | A * | 4/1963 | Gaertner | 562/107 |
| 2005/0170217 | A1 * | 8/2005 | Takahashi et al. | 428/694 ST |

FOREIGN PATENT DOCUMENTS

| JP | 05-062162 A | 3/1993 |
| JP | 07-021546 A | 1/1995 |
| JP | 2001-134922 A | 5/2001 |

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium comprising a magnetic layer comprising a ferromagnetic powder and a binder on a nonmagnetic support, wherein the magnetic layer comprises a compound denoted by general formula (1):

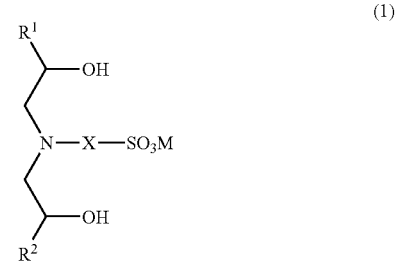

(1)

wherein, in general formula (1), X denotes a divalent linking group, each of $R^1$ and $R^2$ independently denotes an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms, and M denotes a hydrogen atom or a cation.

6 Claims, No Drawings

MAGNETIC RECORDING MEDIUM, METHOD OF MODIFYING SURFACE OF MAGNETIC POWDER AND MAGNETIC COATING MATERIAL

CROSS-REFERENCE TO RELATED APPLICATIONS

This application claims the benefit of priority under 35 USC 119 to Japanese Patent Application No. 2008-090720 filed on Mar. 31, 2008, which is expressly incorporated herein by reference in its entirety.

FIELD OF THE INVENTION

The present invention relates to a magnetic recording medium comprising a magnetic layer comprising a ferromagnetic powder and binder on a nonmagnetic support. More particularly, it relates to a magnetic recording medium comprising a magnetic layer comprising a compound having a sulfonic acid (salt) group, affording good electromagnetic characteristics.

The present invention further relates to a method of modifying a surface of a magnetic powder with a compound having a sulfonic acid (salt) group and a magnetic coating material comprising the compound.

DISCUSSION OF THE BACKGROUND

Metal powders and metal oxides have been employed as microgranular magnetic powders in high-density magnetic recording media in recent years. However, the surfaces of metal powders and metal oxides are hydrophilic, resulting in low affinity for the cyclohexanone, methyl ethyl ketone, and the like employed as solvents for magnetic liquids. Accordingly, it has been proposed that various organic substances having skeletons with high affinity for solvents and adsorptive polar groups be added as dispersing agents and adsorbed to the surface of magnetic powder particles to increase the affinity of the magnetic powder surface to the solvent, thereby increasing wettability by the solvent and promoting dispersion. For example, Japanese Unexamined Patent Publication (KOKAI) Heisei No. 5-62162, Heisei No. 7-21546, and 2001-134922 propose such technique. The contents of these applications are expressly incorporated herein by reference in their entirety.

However, the substances that conventionally have been employed as dispersing agents have themselves had inadequate solvent solubility, making it impossible to ensure adequate adsorption to the surface of magnetic powder. Further, in addition to the functions of adsorbing to the surface of the magnetic powder particles and enhancing solvent affinity, conventional dispersing agents have been inadequate with regard to the function of increasing affinity to organic polymers such as polyurethane that are added as binders and promoting adsorption of these polymers to the magnetic powder surface. Thus, it has been difficult to ensure the electromagnetic characteristics demanded of high-density magnetic recording media in recent years.

SUMMARY OF THE INVENTION

An aspect of the present invention provides for a high-density magnetic recording medium affording good electromagnetic characteristics.

The present inventors conducted extensive research into achieving the above magnetic recording medium, resulting in the discovery that it was attained by the use of a magnetic layer component in the form of an organic sulfur compound denoted by general formula (1). The present invention was devised based on this discovery.

An aspect of the present invention relates to a magnetic recording medium comprising a magnetic layer comprising a ferromagnetic powder and a binder on a nonmagnetic support, wherein the magnetic layer comprises a compound denoted by general formula (1).

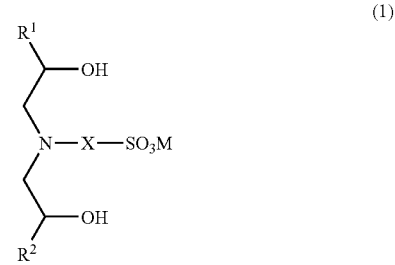

In general formula (1), X denotes a divalent linking group, each of $R^1$ and $R^2$ independently denotes an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms, and M denotes a hydrogen atom or a cation.

The magnetic layer may further comprise a reaction product of the compound denoted by general formula (1) with an isocyanate compound.

The binder comprised in the magnetic layer may comprise a polyurethane resin formed with a diol component in the form of the compound denoted by general formula (1).

The magnetic layer may comprise 0.1 to 30 weight parts of the compound denoted by general formula (1) per 100 weight parts of the ferromagnetic powder.

A further aspect of the present invention relates to a method of modifying a surface of a magnetic powder, comprising mixing a magnetic powder with the compound denoted by general formula (1).

The magnetic powder may be comprised in a magnetic coating material.

The surface of the magnetic powder may be modified to improve dispersibility of the magnetic powder in the magnetic coating material.

A further aspect of the present invention relates to a magnetic coating material comprising a magnetic powder, a binder, and the compound denoted by general formula (1).

The binder may comprise a polyurethane resin formed with a diol component in the form of the compound denoted by general formula (1).

The magnetic coating material may further comprises an isocyanate compound.

The magnetic coating material may be a coating liquid for forming a magnetic layer of a magnetic recording medium.

The present invention can provide a magnetic recording medium having good electromagnetic characteristics by increasing the dispersibility and surface smoothness of a magnetic layer comprising microgranular magnetic powder.

Further, the compound denoted by general formula (1) is capable of forming a strong crosslinked structure with isocyanate compounds, permitting improvement in running durability when employed with isocyanate compounds.

Other exemplary embodiments and advantages of the present invention may be ascertained by reviewing the present disclosure.

DETAILED DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Recording Medium

The present invention relates to a magnetic recording medium comprising a magnetic layer comprising a ferromagnetic powder and binder on a nonmagnetic support. The magnetic recording medium of the present invention comprises the compound denoted by general formula (1) below in the magnetic layer.

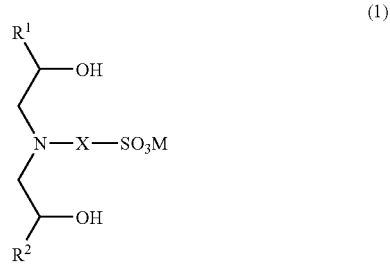

(1)

In general formula (1), X denotes a divalent linking group, each of $R^1$ and $R^2$ independently denotes an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms, and M denotes a hydrogen atom or a cation.

Since the compound denoted by general formula (1) comprises a sulfonic acid (salt) group in the form of a relatively strong polar group, it can ensure strong adsorption to the surface of magnetic powder particles and adequate solvent affinity by imparting a skeleton having a branch OH group. Further, the compound denoted by general formula (1) can exhibit a high affinity for organic polymers such as polyurethane that are employed as binder, and thus function to promote adsorption of these polymers to the magnetic powder surface. This can also increase the dispersibility of the magnetic layer.

Since the compound denoted by general formula (1) is a diol, it can be employed as a starting material for polyurethane resin. When the compound denoted by general formula (1) is employed in combination with a polyurethane resin in which the compound denoted by general formula (1) has been employed as a synthesis starting material, since it contains the same skeleton as the polyurethane resin, good affinity between units of identical skeleton can promote adsorption of the polyurethane and achieve an even better dispersion effect. Further, since the two hydroxyl groups in the compound denoted by general formula (1) can form a strong crosslinked structure with isocyanate compounds, combined use with an isocyanate compound can improve durability.

The compound denoted by general formula (1) will be described in greater detail below.

Compound Denoted by General Formula (1)

In general formula (1), X denotes a divalent linking group, each of $R^1$ and $R^2$ independently denotes an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms, and M denotes a hydrogen atom or a cation.

The divalent linking group denoted by X is desirably a divalent hydrocarbon group; preferably an alkylene group, an arylene group, or a group combining two or more of these; more preferably an alkylene group or arylene group; still more preferably an ethylene group or phenylene group; and most preferably, a phenylene group. Examples of the phenylene group are o-phenylene, m-phenylene, and p-phenylene groups, with an m-phenylene group being desirable.

The above alkylene group desirably comprises 2 to 20 carbon atoms, preferably 2 to 4 carbon atoms, and more preferably, 2 carbon atoms. The above alkylene group can be a linear or branched alkylene, and is desirably a linear alkylene.

The above arylene group desirably comprises 6 to 20 carbon atoms, preferably 6 to 10 carbon atoms, and more preferably, 6 carbon atoms.

The above alkylene and arylene groups can be substituted or unsubstituted. Examples of substituents are given below. The alkylene and arylene groups are desirably groups comprised of carbon and hydrogen atoms. In the present invention, when a given group has a substituent, the "number of carbon atoms" of the group means the number of carbon atoms excluding the substituent.

Examples of optional substituents on the above alkylene group are aryl groups, halogen atoms (fluorine, chlorine, bromine, and iodine atoms), alkoxy groups, aryloxy groups, and alkyl groups.

Examples of optional substituents on the above arylene group are alkyl groups, halogen atoms (fluorine, chlorine, bromine, and iodine atoms), alkoxy groups, aryloxy groups, and aryl groups.

In general formula (1), M denotes a hydrogen atom or a cation.

The cation can be an inorganic cation or an organic cation.

The inorganic cation is not specifically limited; an alkali metal ion or alkaline earth metal ion is desirable, an alkali metal ion is preferred, and $Li^+$, $Na^+$, or $K^+$ is of even greater preference. Of these, $Li^+$ is of particular preference.

Examples of organic cations are ammonium ions, quaternary ammonium ions, and pyridinium ions.

M desirably denotes a hydrogen atom or an alkali metal ion; preferably denotes a hydrogen atom, $Li^+$, $Na^+$, or $K^+$; and from the perspective of enhancing dispersibility, is desirably $Li^+$.

In general formula (1), each of $R^1$ and $R^2$ independently denotes an alkyl group having 2 to 20 carbon atoms, an aryl group having 6 to 20 carbon atoms, an aralkyl group having 7 to 20 carbon atoms, an alkoxyalkyl group having 2 to 20 carbon atoms, or an aryloxyalkyl group having 7 to 20 carbon atoms.

The above alkyl group comprises 2 to 20 carbon atoms, desirably 2 to 8 carbon atoms, and preferably, 2 to 4 carbon atoms.

The above aryl group comprises 6 to 20 carbon atoms, desirably 6 to 10 carbon atoms, and preferably, 6 carbon atoms.

The above aralkyl group comprises 7 to 20 carbon atoms, desirably 7 to 11 carbon atoms.

The above alkoxyalkyl group comprises 2 to 20 carbon atoms, desirably 2 to 12 carbon atoms, and preferably, 2 to 5 carbon atoms.

The above aryloxyalkyl group comprises 7 to 20 carbon atoms, desirably 7 to 12 carbon atoms, and preferably, 7 carbon atoms.

The above alkyl group, aryl group, aralkyl group, alkoxyalkyl group, and aryloxyalkyl group can be substituted or unsubstituted. Examples of substituents are halogen atoms (fluorine, chlorine, bromine, and iodine atoms), hydroxy groups, sulfonyl groups, and silyl groups.

The above alkyl group and aralkyl group can be linear or branched.

The compound denoted by general formula (1) desirably comprises one or more intramolecular aromatic rings to further enhance solubility in organic solvents.

In general formula (1), $R^1$ and $R^2$ are identical or different, but from the perspective of facilitating synthesis, are desirably identical.

In general formula (1), each of $R^1$ and $R^2$ desirably denotes a group having 2 or more carbon atoms. In general formula (1), each of $R^1$ and $R^2$ desirably denotes a group having an aromatic ring and/or an ether bond.

$R^1$ and $R^2$ desirably denote ethyl groups, methoxymethyl groups, butoxymethyl groups, phenoxymethyl groups, or phenyl groups; and preferably denote methoxymethyl groups, butoxymethyl groups, phenoxymethyl groups, or phenyl groups.

Example Compounds (S-1) to (S-37) below are desirable specific examples of the compound denoted by general formula (1). However, the present invention is not limited thereto. In the specific examples given below, "Ph" denotes a phenyl group.

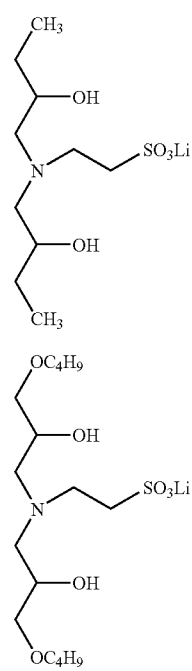

(S-1)

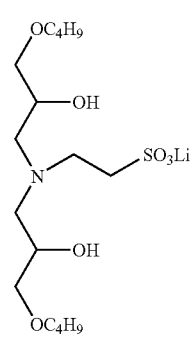

(S-2)

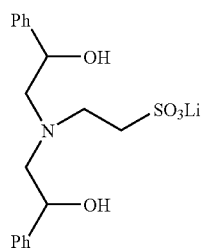

(S-3)

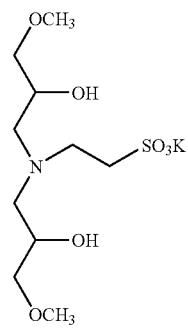

(S-4)

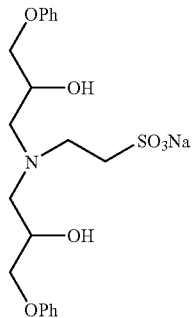

(S-5)

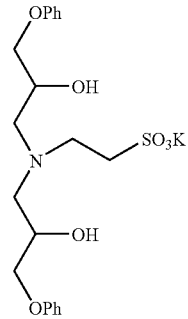

(S-6)

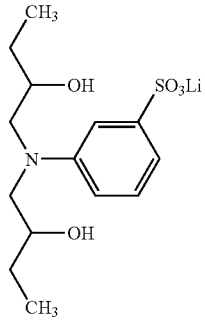

(S-7)

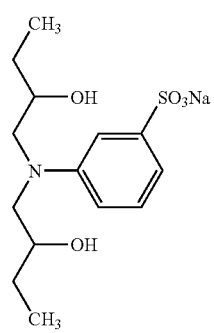 (S-8)
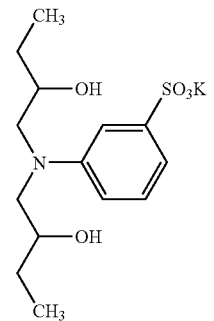 (S-9)
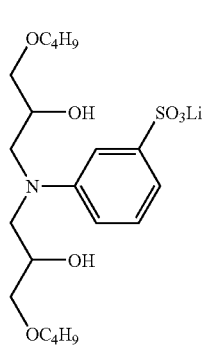 (S-10)
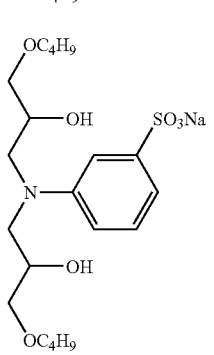 (S-11)
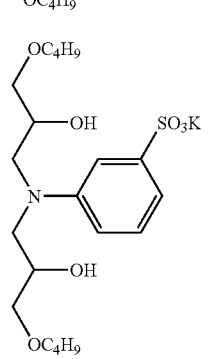 (S-12)
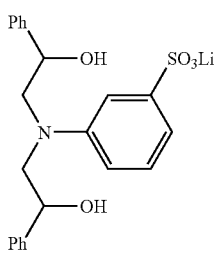 (S-13)
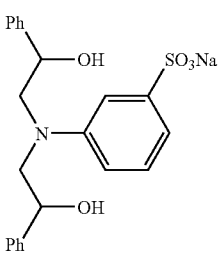 (S-14)
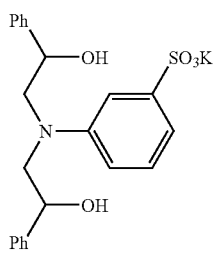 (S-15)
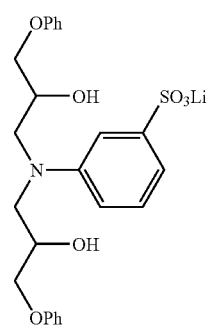 (S-16)
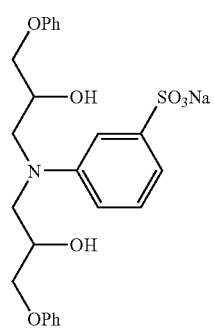 (S-17)

(S-18) 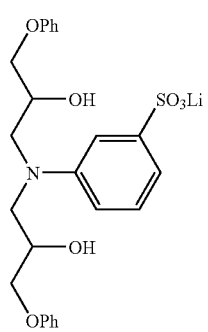
(S-19) 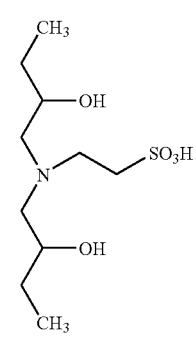
(S-20) 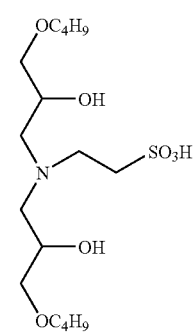
(S-21) 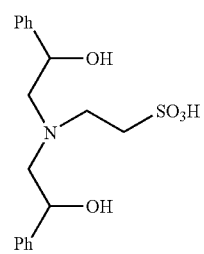
(S-22) 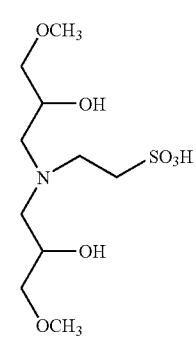
(S-23) 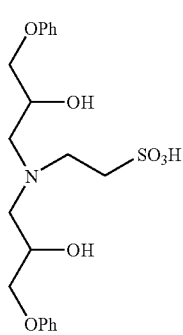
(S-24) 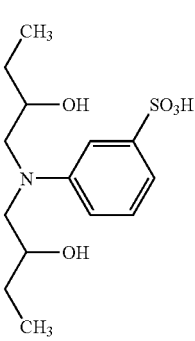
(S-25) 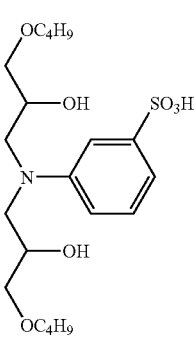
(S-26) 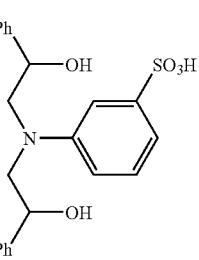
(S-27) 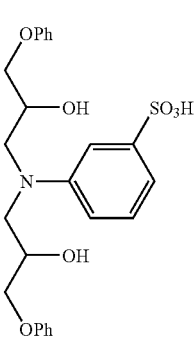

(S-28) 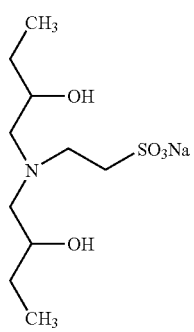
(S-29) 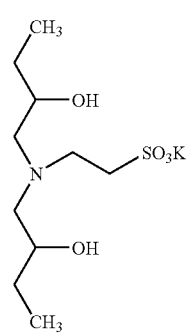
(S-30) 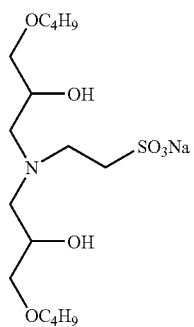
(S-31) 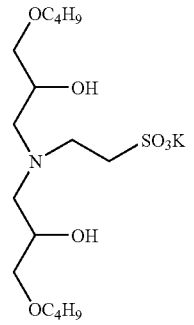
(S-32) 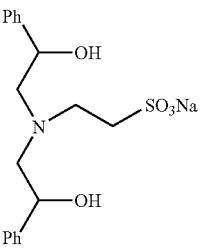
(S-33) 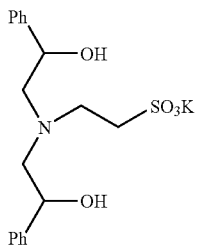
(S-34) 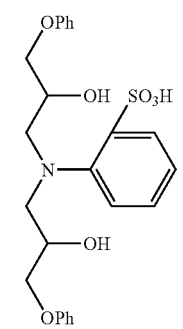
(S-35) 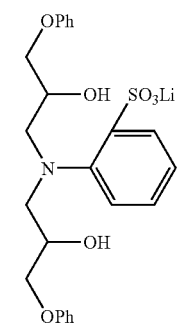
(S-36) 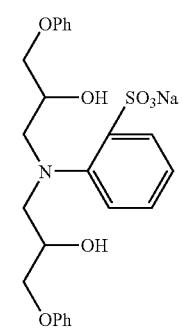
(S-37) 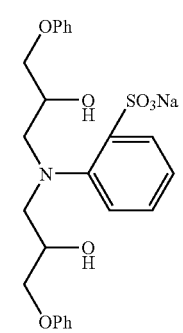
The method of synthesizing the compound denoted by general formula (1) is not specifically limited. The methods set forth below are particularly desirable examples.

An aminoalkanesulfonic acid or a salt thereof, or an aminoarenesulfonic acid or a salt thereof, is subjected to the action of a base in water. Next, an epoxy compound can be added to the water and the mixture reacted to obtain the compound denoted by general formula (1). The isolation method may depend on the base or the like that is used. For example, the addition of a suitable quantity of toluene to the reaction solution can cause precipitation as a sulfonate compound. This compound can be removed by filtration, decantation, or the like and dried to obtain a sulfonate compound (the compound denoted by general formula (1)) of high purity. The sulfonate compound obtained can be subjected to salt exchange by a known method to obtain another sulfonate compound, or the salt can be removed by a known method to obtain a sulfonic acid compound.

The above base is not specifically limited, and may be selected based on the desired salt compound. It is desirably an alkali metal hydroxide.

The above epoxy compound is not specifically limited, and may be selected based on the desired compound. From the perspective of reactivity, one of the two carbon atoms on the epoxy ring is desirable a methylene group ($-CH_2-$).

The magnetic recording medium of the present invention comprises a magnetic layer comprising the compound denoted by general formula (1) on a nonmagnetic support.

The magnetic recording medium of the present invention will be described in greater detail below.

Magnetic Layer

Ferromagnetic Powder

An acicular ferromagnetic powder, plate-shaped ferromagnetic powder, or spherical or elliptical ferromagnetic powder may be employed as the ferromagnetic powder. Each of these will be described below.

(1) Acicular Ferromagnetic Powder

Examples of acicular ferromagnetic powders that are suitable for use as the ferromagnetic powder in the magnetic recording medium of the present invention are acicular ferromagnetic metal powders such as cobalt-containing ferromagnetic iron oxide and ferromagnetic alloy powders. The BET specific surface area (SBET) is desirably equal to or greater than 40 $m^2/g$ and equal to or less than 80 $m^2/g$, preferably equal to or greater than 50 $m^2/g$ and equal to or less than 70 $m^2/g$. The crystallite size is desirably equal to or greater than 8 nm and equal to or less than 25 nm, preferably equal to or greater than 9 nm and equal to or less than 22 nm, and more preferably, equal to or greater than 10 nm and equal to or less than 20 nm. The major axis length is desirably equal to or greater than 20 nm and equal to or less than 50 nm, preferably equal to or greater than 20 nm and equal to or less than 45 nm.

Examples of ferromagnetic powders are ferromagnetic metal powders in the form of yttrium-containing Fe, Fe—Co, Fe—Ni, Co—Ni—Fe, and the like. The yttrium content of the ferromagnetic powder, given as the ratio of yttrium atoms to iron atoms, Y/Fe, is desirably equal to or greater than 0.5 atomic percent and equal to or less than 20 atomic percent, preferably equal to or greater than 5 atomic percent and equal to or less than 10 atomic percent. At equal to or greater than 0.5 atomic percent, a high as can be achieved in the ferromagnetic powder and good magnetic characteristics and good electromagnetic characteristics can be achieved, which are desirable. The content not exceeding 20 atomic percent is desirable in that the iron content is suitable, good magnetic characteristics can be achieved, and good electromagnetic characteristics can be achieved. Within a range of equal to or less than 20 atomic percent per 100 atomic percent of iron, it is possible to incorporate aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium, bismuth, and the like. The ferromagnetic metal powder may also contain small quantities of water, hydroxides, oxides, or the like.

An example of a method of manufacturing a ferromagnetic powder incorporating cobalt and yttrium that is utilizable as the ferromagnetic powder is given below.

An example of the use of a starting material in the form of an iron oxyhydroxide obtained by blowing an oxidizing gas into an aqueous suspension of a mixture of a ferrous salt and an alkali will be given.

$\alpha$-FeOOH is desirable as the iron oxyhydroxide. It can be manufactured by a first method, by which the ferrous salt is neutralized by an alkali hydroxide to obtain an aqueous suspension of $Fe(OH)_2$, and the oxidizing gas is blown into the suspension to obtain acicular $\alpha$-FeOOH. There is also a second method by which the ferrous salt is neutralized by the alkali carbonate to obtain a $FeCO_3$ aqueous suspension, and an oxidizing gas is blown into the suspension to obtain spindle-shaped $\alpha$-FeOOH. Such iron oxyhydroxide is desirably obtained by reacting a ferrous salt aqueous solution with an alkali aqueous solution to obtain an aqueous solution containing ferrous hydroxide, which is then oxidized by air oxidation or the like. In this process, Ni salt; salts of alkaline earth elements such as Ca, Ba, and Sr; Cr salt; Zn salt; and the like may be present. The shape (aspect ratio) of the particles and the like can be adjusted through the suitable selection of such salts.

Ferrous chloride, ferrous sulfate, and the like are desirable as ferrous salts. Sodium hydroxide, ammonia water, ammonium carbonate, sodium carbonate, and the like are desirable as alkalis. Examples of salts that may also be present are chlorides such as nickel chloride, calcium chloride, barium chloride, strontium chloride, chromium chloride, and zinc chloride.

Next, when introducing cobalt to the iron, prior to introducing the yttrium, an aqueous solution of a cobalt compound such as cobalt sulfate or cobalt chloride is mixed into a slurry of the iron oxyhydroxide. After preparing a slurry of iron oxyhydroxide that contains cobalt, an aqueous solution containing an yttrium compound is added to the slurry and mixed with stirring to introduce the yttrium.

In addition to yttrium, it is also possible to introduce neodymium, samarium, praseodymium, lanthanum, gadolinium, and the like into the ferromagnetic powder. These can be introduced using chlorides such as yttrium chloride, neodymium chloride, samarium chloride, praseodymium chloride, and lanthanum chloride; nitrates such as neodymium nitrate and gadolinium nitrate; and the like, which can be employed in combinations of two or more.

The coercivity (Hc) of the ferromagnetic metal powder is desirably equal to or greater than 159.2 kA/m and equal to or less than 238.8 kA/m (approximately equal to or greater than 2,000 Oe and equal to or less than 3,000 Oe), preferably equal to or greater than 167.2 kA/m and equal to or less than 230.8 kA/m (approximately equal to or greater than 2,100 Oe and equal to or less than 2,900 Oe).

Further, the saturation magnetic flux density is desirably equal to or greater than 150 mT and equal to or less than 300 mT (approximately equal to or greater than 1,500 G and equal to or less than 3,000 G), preferably equal to or greater than 160 mT and equal to or less than 290 mT (approximately equal to or greater than 1,600 G and equal to or less than 2,900 G). The saturation magnetization ($\sigma$s) is desirably equal to or greater than 100 A·m²/kg and equal to or less than 170 A·m²/kg (approximately equal to or greater than 100 emu/g and equal to or less than 170 emu/g), preferably equal to or greater than 110 A·m²/kg and equal to or less than 160 A·m²/kg (approximately equal to or greater than 110 emu/g and equal to or less than 160 emu/g).

The switching field distribution (SFD) of the magnetic powder itself is desirably low, preferably equal to or less than 0.8. When the SFD is equal to or less than 0.8, good electromagnetic characteristics can be achieved, output can be high, inversion of magnetization can be sharp with a small peak shift, and thus suitability to high-density digital magnetic recording can be achieved. To reduce the Hc distribution, it is possible to employ methods such as improving the particle size distribution of goethite in the ferromagnetic metal powder, employing monodisperse $\alpha\text{-Fe}_2\text{O}_3$, and preventing sintering between particles.

(2) Plate-Shaped Ferromagnetic Powder

Examples of plate-shaped ferromagnetic powders that are suitable for use as the ferromagnetic powder are hexagonal ferrite powders. Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, Zr, Zn and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The particle size, as a hexagonal plate diameter, preferably ranges from 10 to 50 nm. When employing a magnetoresistive head in reproduction, a plate diameter equal to or less than 40 nm is desirable to reduce noise. A plate diameter within the above range can yield stable magnetization without the effects of thermal fluctuation and achieve low noise, that is suitable for high-density magnetic recording.

The plate ratio (plate diameter/plate thickness) of the hexagonal ferrite powder preferably ranges from 1 to 15, more preferably from 2 to 7. A plate ratio within the above range is preferable to achieve adequate orientation and prevent stacking between particles, resulting in low noise. The specific surface area by BET method of the hexagonal ferrite powders having such particle sizes ranges from 10 to 200 m²/g, almost corresponding to an arithmetic value from the particle plate diameter and the plate thickness. A crystallite size desirably ranges from 50 to 450 Angstroms, preferably, from 100 to 350 Angstroms. Narrow distributions of particle plate diameter and thickness are normally good. Although difficult to render in number form, about 500 particles can be randomly measured in a transmission electron microscope (TEM) photograph of particles to make a comparison. This distribution is often not a normal distribution. However, when expressed as the standard deviation to the average particle size, σ/average particle size is preferably 0.1 to 2.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (He) of the hexagonal ferrite powder of about 39.8 to 398 kA/m (approximately 500 to 5,000 Oe) can be achieved. A high coercivity (He) is advantageous for high-density recording, but this is limited by the capacity of the recording head. The hexagonal ferrite powder employed in the present invention normally has a coercivity (He) ranging from 63.7 to 318.4 kA/m (approximately 800 to 4,000 Oe), preferably 119.4 to 278.6 kA/m (approximately 1,500 to 3,500 Oe). When the saturation magnetization of the head exceeds 1.4 tesla, the hexagonal ferrite having a coercivity (He) of equal to or higher than 159.2 kA/m (approximately 2,000 Oe) is preferably employed.

The coercivity (He) can be controlled by particle size (plate diameter and plate thickness), the types and quantities of elements contained, substitution sites of the element, the particle producing reaction conditions, and the like. The saturation magnetization (as) can be 40 to 80 A·m²/kg (approximately 40 to 80 emu/g). The higher saturation magnetization (σs) is preferred, however, it tends to decrease with decreasing particle size. Known methods of improving saturation magnetization (σs) are combining spinel ferrite with magnetoplumbite ferrite, selection of the type and quantity of elements incorporated, and the like. It is also possible to employ W-type hexagonal ferrite.

When dispersing the magnetic powder, the surface of the magnetic powder can be processed with a substance suited to a dispersion medium and a polymer Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added can range from 0.1 to 10 weight percent relative to the weight of the magnetic powder. The pH of the magnetic powder is also important to dispersion. A pH of about 4 to 12 is usually optimum for the dispersion medium and polymer. From the perspective of the chemical stability and storage properties of the medium, a pH of about 6 to 10 can be selected. Moisture contained in the magnetic powder also affects dispersion. There is an optimum level for the dispersion medium and polymer, usually selected from the range of 0.01 to 2.0 weight percent.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to equal to or greater than 100° C.; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention.

(3) Spherical or Elliptical Magnetic Powder

An iron nitride ferromagnetic powder with a primary phase in the form of $Fe_{16}N_2$ is desirable as a spherical or elliptical magnetic powder. In addition to Fe and N, atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb can be contained in the iron nitride ferromagnetic powder. The content of N relative to Fe is desirably equal to or greater than 1.0 atomic percent and equal to or less than 20.0 atomic percent.

The iron nitride is desirably spherical or elliptical, and desirably has an aspect ratio of major axis diameter/minor axis diameter of equal to or greater than 1 and equal to or less than 2. The BET specific surface area (SBET) is desirably equal to or greater than 30 $m^2/g$ and equal to or less than 100 $m^2/g$, preferably equal to or greater than 50 $m^2/g$ and equal to or less than 70 $m^2/g$. The crystallite size is desirably equal to or greater than 12 nm and equal to or less than 25 nm, preferably equal to or greater than 13 nm and equal to or less than 22 nm.

The saturation magnetization σs is desirably equal to or greater than 50 $A \cdot m^2/kg$ (approximately 50 emu/g) and equal to or less than 200 $A \cdot m^2/kg$ (approximately 200 emu/g), preferably equal to or greater than 70 $A \cdot m^2/kg$ (approximately 70 emu/g) and equal to or less than 150 $A \cdot m^2/kg$ (approximately 150 emu/g).

From the perspective of enhancing the dispersibility of the microgranular magnetic powders, particularly those having the above desirable particle size, the content of the compound denoted by general formula (1) in the magnetic layer is desirably equal to or greater than 0.1 weight part, and from the perspective of maintaining magnetic characteristics, equal to or less than 30 weight parts, per 100 weight parts of ferromagnetic powder. It is preferably 0.1 to 20 weight parts, more preferably, 0.1 to 10 weight parts, per 100 weight parts of ferromagnetic powder.

Binder

Polyurethane resins; polyester resins; polyamide resins; vinyl chloride resins; acrylic resins obtained by copolymerizing styrene, acrylonitrile, methyl methacrylate, and the like; cellulose resins such as nitrocellulose; epoxy resins; phenoxy resins; polyvinyl alkylal resins such as polyvinyl acetal and polyvinyl butyral; and the like can be employed singly, or a number of such resins can be mixed for use, as the binder contained in the magnetic layer. Of these, the resins of preference are polyurethane resins, acrylic resins, cellulose resins, and vinyl chloride resins. These resins may also be employed as binder in the nonmagnetic layer, described further below.

To enhance the dispersibility of the ferromagnetic powder and nonmagnetic powder, the binder desirably has a functional group (polar group) adsorbing to the surface of the powders. Desirable functional groups include $—SO_3M$, $—SO_4M$, $—PO(OM)_2$, $—OPO(OM)_2$, $—COOM$, $=NSO_3M$, $=NRSO_3M$, $—NR^1R^2$, and $—N^+R^1R^2R^3X^-$.

In the above, M denotes hydrogen or an alkali metal such as Na or K; R denotes an alkylene group; $R^1$, $R^2$, and $R^3$ denote alkyl groups, hydroxyalkyl group, or hydrogen; and X denotes a halogen such as Cl or Br. The quantity of functional groups in the binder is desirably equal to or greater than 10 μeq/g and equal to or less than 200 μeq/g, preferably equal to or greater than 30 μeq/g and equal to or less than 120 μeq/g. The above range is desirable in that good dispersibility can be achieved.

A functional group having active hydrogen, such as a —OH group, is desirably imparted to the binder in addition to an adsorptive functional group to form a crosslinked structure by reacting with an isocyanate curing agent for improvement of coating strength. The content of such functional group is desirably $1 \times 10^{-5}$ eq/g to $2 \times 10^{-3}$ eq/g, preferably $1 \times 10^{-5}$ eq/g to $1 \times 10^{-3}$ eq/g, and more preferably, $1 \times 10^{-5}$ eq/g to $5 \times 10^{-4}$ eq/g. A content of the functional group of equal to or greater than $1 \times 10^{-5}$ eq/g is desirable in that it is then possible to achieve adequate adsorptive strength to the magnetic powder, as well as good dispersibility. A content of equal to or less than $2 \times 10^{-3}$ eq/g is desirable in that good solubility in solvent can be achieved.

The molecular weight of the binder, as a weight average molecular weight, is desirably equal to or greater than 10,000 and equal to or less than 200,000, preferably equal to or greater than 20,000 and equal to or less than 100,000. The above range is desirable in that coating strength can be adequate, durability can be good, and dispersibility can be enhanced.

Examples of polyurethane resins that are desirable as binders are described in detail in the "Polyurethane Resin Handbook," ed. by IWADA Seiji, 1986, Nikkan Kogyo Shimbun, Ltd., which is expressly incorporated herein by reference in its entirety. They are normally obtained by addition polymerization of a long-chain diol, short-chain diol (also known as a chain-extending agent), and an isocyanate compound. A long-chain diol with a molecular weight of equal to or greater than 500 and equal to or less than 5,000 in the form of a polyester diol, polyether diol, polyether ester diol, polycarbonate diol, polyolefin diol, or the like can be suitably employed. Based on the long-chain diol, the polyurethane resin is referred to as polyester urethane, polyether urethane, polyether ester urethane, polycarbonate urethane, and so forth.

Polyester diols are obtained by condensation polymerization of an aliphatic dibasic acid such as adipic acid, sebacic acid, or azelaic acid, or an aromatic dibasic acid such as isophthalic acid, orthophthalic acid, terephthalic acid, or naphthalenedicarboxylic acid, and a glycol. Examples of the glycol component are ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexanedimethanol, and hydrogenated bisphenol A. In addition to the above, a polycaprolactonediol or a polyvalerolactonediol obtained by ring-opening polymerization of a lactone such as ε-caprolactone or γ-valerolactone can be employed as the polyester diol.

From the perspective of resistance to hydrolysis, the polyester diol desirably comprises a branched side chain or is obtained from an aromatic or alicyclic starting material.

Examples of polyether diols are polyethylene glycol; polypropylene glycol; polytetramethylene glycol; and addition polymerization products of an alicyclic diol or an aromatic glycol such as bisphenol A, bisphenol S, bisphenol P, or hydrogenated bisphenol A, and an alkylene oxide such as ethylene oxide or propylene oxide.

Multiple long-chain diols from among the above can be employed in combination or mixed for use.

The short-chain diol can be selected from the same group of compounds as that given by way of example for the glycol component of the polyester diol above. The incorporation of a small quantity of a trifunctional or greater polyhydric alcohol, such as trimethylol ethane, trimethylol propane, or pentaerythritol can yield a polyurethane resin with a branched structure, reducing the solution viscosity and increasing the number of terminal OH groups and thereby enhancing curability by the isocyanate curing agent.

Diisocyanate compounds can be employed in the form of aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic and alicyclic diisocyanates such as trans-cyclohexane-1,4-diisocyanate, HDI (hexamethylene diisocyanate), IPDI (isophorone diisocyanate), $H_6$XDI (hydrogenated xylylene diisocyanate), and $H_{12}$MDI (hydrogenated diphenylmethane diisocyanate).

The ratio of long-chain diol/short-chain diol/diisocyanate in the polyurethane resin is desirably (80 to 15 weight percent)/(5 to 40 weight percent)/(15 to 50 weight percent).

The urethane group concentration of the polyurethane resin is desirably equal to or greater than 1 meq/g and equal to or less than 5 meq/g, preferably equal to or greater than 1.5 meq/g and equal to or less than 4.5 meq/g. A urethane group concentration falling within this range is desirable in that it can yield high mechanical strength, good solution viscosity, and good dispersibility.

The glass transition temperature of the polyurethane resin is desirably equal to or higher than 0° C. and equal to or lower than 200° C., preferably equal to or higher than 40° C. and equal to or lower than 160° C. A glass transition temperature within this range is desirable in that high durability, good calendering moldability, and good electromagnetic characteristics can be achieved.

Methods of incorporating the above adsorptive functional group (polar group) into the polyurethane resin include the method of employing a functional group for part of the long-chain diol monomer, the method of employing it as part of the short-chain diol, and the method of incorporating the functional group by a polymer reaction after polymerizing the polyurethane.

Examples of vinyl chloride resins that can be employed as the binder are those obtained by copolymerizing various monomers with a vinyl chloride monomer.

Comonomers can be employed in the form of fatty acid vinyl esters such as vinyl acetate and vinyl propionate; acrylates and methacrylates such as methyl (meth)acrylate, ethyl (meth)acrylate, isopropyl (meth)acrylate, butyl (meth)acrylate, and benzyl (meth)acrylate; alkyl allyl ethers such as allyl methyl ether, allyl ethyl ether, allyl propyl ether, and allyl butyl ether; as well as styrene, α-methylstyrene, vinylidene chloride, acrylonitrile, ethylene, butadiene, and acrylamide. Comonomers having functional groups can be employed in the form of vinyl alcohol, 2-hydroxyethyl (meth)acrylate, polyethylene glycol (meth)acrylate, 2-hydroxypropyl (meth)acrylate, 3-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and Na salts and K salts thereof.

The proportion of vinyl chloride monomer in the vinyl chloride resin is desirably equal to or greater than 60 weight percent and equal to or less than 95 weight percent. A proportion within this range is desirable in that good mechanical strength, good solvent solubility, and dispersibility due to suitable solution viscosity can be achieved.

The desired quantity of the functional group for enhancing the curing property of the adsorptive functional group (polar group) and the polyisocyanate curing agent is as set forth above. The functional group can be incorporated by copolymerization with the above functional group-containing monomers, or by copolymerization of the vinyl chloride resin followed by introduction of the functional group in a polymer reaction.

The degree of polymerization is desirably equal to or higher than 200 and equal to or lower than 600, preferably equal to or higher than 240 and equal to or lower than 450. The above range is desirable in that good mechanical strength and good dispersibility due to suitable solution viscosity can be achieved.

A curing agent is desirably employed to crosslink and cure the binder and increase the mechanical strength and heat resistance of the coating. Examples of desirable curing agents are isocyanate compounds. The compound denoted by general formula (1) has two hydroxyl groups, and is capable of forming a strong crosslinked structure with isocyanate compounds. When a magnetic layer coating liquid comprising the compound of general formula (1) and an isocyanate compound is coated to the nonmagnetic support, either directly or over another layer such as a nomnagnetic layer, and heat treated, a crosslinking reaction takes place between the compound denoted by general formula (1) and the isocyanate compound. Thus, a reaction product of the compound denoted by general formula (1) and an isocyanate compound is contained in the magnetic layer. Such a magnetic layer can afford good durability because it contains an intralayer crosslinked structure. Accordingly, durability can be improved by employing the compound denoted by general formula (1) in combination with an isocyanate compound. The above heat treatment can be conducted for 12 to 48 hours at a temperature of 50 to 90° C., for example.

The isocyanate compound is desirably a trifunctional or higher polyisocyanate compound. Specific examples are adduct-type polyisocyanate compounds such as a compound obtained by adding 3 moles of TDI (tolylene diisocyanate) to 1 mole of trimethylolpropane (TMP), a compound obtained by adding 3 moles of HDI (hexamethylene diisocyanate) to 1 mole of TMP, a compound obtained by adding 3 moles of IPDI (isophorone diisocyanate) to 1 mole of TMP, and a compound obtained by adding 3 moles of XDI (xylylene diisocyanate) to 1 mole of TMP. Further specific examples are TDI condensation isocyanurate trimers, TDI condensation isocyanurate pentamers, TDI condensation isocyanurate type heptamers, mixtures thereof, HDI isocyanurate condensates, IPDI isocyanurate condensates, and crude MDI.

Of these, the compound obtained by adding 3 moles of TDI to TMP, and TDI isocyanurate trimer are desirable.

From the perspectives of achieving good dispersibility and durability, the content of the isocyanate compound in the magnetic layer is desirably 10 to 200 weight parts per 100 weight parts of the compound denoted by general formula (1).

In addition to the isocyanate curing agent, a curing agent that is cured by radiation such as an electron beam or ultraviolet radiation can be employed. In that case, a curing agent having two or more, desirably three or more, intramolecular radiation-curable functional groups in the form of acryloyl groups or methacryloyl groups can be employed. Examples are TMP (trimethylolpropane) triacrylate, pentaerythritol tetraacrylate, and urethane acrylate oligomers. In that case, (meth)acryloyl groups are desirably incorporated into the binder as well as the curing agent. When curing is conducted with ultraviolet radiation, a photosensitizing agent is additionally employed.

The curing agent is desirably added in a quantity of 0 weight parts to 80 weight parts per 100 weight parts of binder. The above range is desirable in that dispersibility can be good.

Since the compound denoted by general formula (1) can be a diol, it can be employed as a starting material in the synthesis of polyurethane resin. The magnetic layer containing the compound denoted by general formula (1) in the magnetic recording medium of the present invention desirably comprises a binder in the form of a polyurethane resin formed with a diol component in the form of the compound denoted by general formula (1). Since such polyurethane resin has the same skeleton as the compound denoted by general formula (1), the high adsorptivity of the polyurethane resin and the compound denoted by general formula (1) due to the good affinity between units with identical radical skeletons can further enhance dispersibility.

The polyurethane resin is desirably obtained employing another polyol in addition to the compound denoted by general formula (1) as the polyol. The additional polyol is not specifically limited; known polyols may be employed as needed, such as polyester polyols, polyether polyols, polyether ester polyols, polycarbonate polyols, polyolefin polyols, and dimer diols.

Of these, polyester polyols and polyether polyols are desirable.

The polyester polyol can be obtained by polycondensation of a polycarboxylic acid (polybasic acid) and a polyol, and is desirably obtained by reacting a dibasic acid (dicarboxylic acid) and a diol. The dibasic acid component employed in the polyester polyol is not specifically limited; adipic acid, azelaic acid, phthalic acid, sodium sulfoisophthalic acid, and the like are desirable. Compounds having branched side chains such as 2,2-dimethyl-1,3-propanediol, 2-ethyl-2-butyl-1,3-propanediol, and 3-methyl-1,5-pentanediol can be employed as the diol.

The polyether polyol desirably has a cyclic structure such as that of a polypropyleneoxide adduct of bisphenol A or a polyethyleneoxide adduct of bisphenol A.

In addition to the above polyol, as needed, a chain-extending agent in the form of a known short-chain polyol having a molecular weight of about 200 to 500 can be employed. Of these, aliphatic polyols having branched side chains with two or more carbon atoms, ether compounds having cyclic structures, short-chain diols having bridged hydrocarbon structures, and single-chain diols having spiro structures are desirable.

The following are examples of aliphatic diols having branched side chains with two or more carbon atoms: 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pendanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pendanediol, 3-butyl-1,5-pentanediol, 3-octyl-1,5-pentanediol, 3-myristyl-1,5-pendanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Of these, 2-ethyl-2-butyl-1,3-propanediol and 2,2-diethyl-1,3-propanediol are desirable.

Examples of ether compounds having cyclic structures are ethyleneoxide adducts of bisphenol A, propyleneoxide adducts of bisphenol A, ethyleneoxide adducts of hydrogenated bisphenol A, and propyleneoxide adducts of hydrogenated bisphenol A.

At least one structure is desirably selected from formulas (1) to (3) below as the bridged hydrocarbon structure or spiro structure.

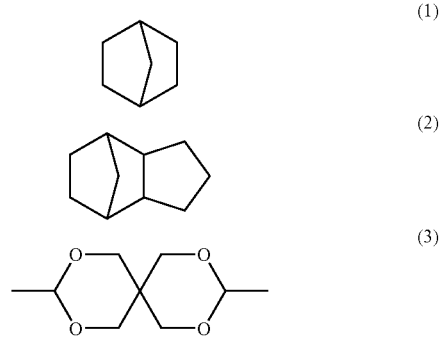

Specific examples of short-chain diols having a bridged hydrocarbon structure are: bicyclo[1.1.0]butanediol, bicyclo[1.1.1]pentanediol, bicyclo[2.1.0]pentanediol, bicyclo[2.1.1]hexanediol, bicylo[3.1.0]hexanediol, bicyclo[2.2.1]heptanediol, bicyclo[3.2.0]heptanediol, bicyclo[3.1.1]heptanediol, bicyclo[2.2.2]octanediol, bicyclo[3.1.1]heptanediol, bicyclo[2.2.2]octanediol, bicyclo[3.2.1]octanediol, bicyclo[4.2.0]octanediol, bicyclo[5.2.0]nonanediol, bicyclo[3.3.1]nonanediol, bicyclo[3.3.2]decanediol, bicyclo[4.2.2]decanediol, bicyclo[4.3.3]dodecanediol, bicyclo[3.3.3]undecanediol, bicyclo[1.1.0]butanedimethanol, bicyclo[1.1.1]pentanedimethanol, bicyclo[2.1.0]pentanedimethanol, bicyclo[2.1.1]hexanedimethanol, bicyclo[3.1.0]hexanedimethanol, bicyclo[2.2.1]heptanedimethanol, bicyclo[3.2.0]heptanedimethanol, bicyclo[3.1.1]heptanedimethanol, bicyclo[2.2.2]octanedimethanol, bicyclo[3.2.1]octanedimethanol, bicyclo[4.2.0]octanedimethanol, bicyclo[5.2.0]nonanedimethanol, bicyclo[3.3.1]nonanedimethanol, bicyclo[3.3.2]decanedimethanol, bicyclo[4.2.2]decanedimethanol, bicyclo[4.3.3]dodecanedimethanol, bicyclo[3.3.3]undecanedimethanol, tricyclo[2.2.1.0]heptanediol, tricyclo[5.2.1.0$^{2,6}$]decanediol, tricyclo[4.2.1.2$^{7,9}$]undecanediol, tricyclo[5.4.0.0$^{2,9}$]undecanediol, tricyclo[5.3.1.1]dodecanediol, tricyclo[4.4.1.1]dodecanediol, tricyclo[7.3.2.0$^{5,13}$]tetradecanediol, tricyclo[5.5.1.0$^{3,11}$]tridecanediol, tricyclo[2.2.1.0]heptanedimethanol, tricyclo[5.2.1.0$^{2,6}$]decanedimethanol, tricyclo[4.2.1.2$^{7,9}$]undecanedimethanol, tricyclo[5.4.0.0$^{2,9}$]undecanedimethanol, tricyclo[5.3.1.1]dodecanedimethanol, tricyclo[4.4.1.1]dodecanedimethanol, tricyclo[7.3.2.0$^{5,13}$]tetradecanedimethanol, and tricyclo[5.5.1.0$^{3,11}$]tridecanedimethanol.

Of these, tricyclo[5.2.1.0$^{2,6}$]decanedimethanol is desirable.

Specific examples of short-chain diols having a spiro structure are: spiro[3,4]octanedimethanol, spiro[3,4]heptanedimethanol, spiro[3,4]decanedimethanol, dispiro[5,1,7,2]heptadecanedimethanol, cyclopentanespirocyclobutanedimethanol, cyclohexanespirocyclopentanedimethanol, spirobicyclohexanedimethanol, and bis(1,1-dimethyl-2-hydroxyethyl)-2,4,8,10-tetraoxaspiro[5,5]undecane.

Bis(1,1-dimethyl-2-hydroxyethyl)-2,4,8,10-tetraoxaspiro[5,5]undecane is desirable.

Diisocyanate is suitably employed as the polyisocyanate serving as a starting material in the synthesis of the polyurethane resin.

The diisocyanate is not specifically limited; known diisocyanates can be employed. Specific desirable examples are tolylene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate.

The polyurethane resin can be manufactured by polymerizing (inducing polyaddition of) the compound denoted by general formula (1), other polyol, a polyisocyanate, and, as needed, a chain-extending agent in the presence of a catalyst. The compound denoted by general formula (1) is desirably added in a quantity producing a sulfonic acid (salt) group content of equal to or greater than $1\times10^{-5}$ eq/g and equal to or less than $2\times10^{-3}$ eq/g. The other polyol is desirably added within a range of 20 to 45 weight percent. The polyisocyanate is desirably added in a quantity producing a concentration of the urethane group of the polyurethane resin within a range of 2.5 to 4.5 mmole/g.

Known polyurethane resin polymerization catalysts can be employed as the catalyst; examples are tertiary amine catalysts and organic tin catalysts. Examples of tertiary amine catalysts are diethylenetriamine, N-methylmorpholine, and tetramethylhexamethylenediamine. Examples of organic tin catalysts are dibutyltin dilaurate and stannous octoate. Organic tin catalysts are desirably employed as the catalyst.

The catalyst is desirably added in a quantity of 0.01 to 5 weight parts, preferably 0.01 to 1 weight part, and more preferably, 0.01 to 0.1 weight part per the total weight of the synthesis components employed in polymerization in the form of the compound denoted by general formula (1), the other polyol, the polyisocyanate, and, as needed, an additional chain-extending agent.

The compound denoted by general formula (1), the polyol, and the isocyanate are desirably dissolved in a solvent (polymerization solution) and polymerized while applying heat, applying pressure, backfilling with nitrogen, and the like as needed. The solvent employed can be selected from among known solvents employed in the synthesis of polyurethane resins; examples are ketone solvents such as acetone, methyl ethyl ketone, and cyclohexanone; ester solvents such as methyl acetate, ethyl acetate, and ethyl lactate; ether solvents such as dioxane and tetrahydrofuran; aromatic solvents such as toluene and xylene; amide solvents such as N,N-dimethylformamide, N,N-dimethylacetamide, and N-methylpyrrolidone; sulfoxide solvents such as dimethylsulfoxide; methylene chloride; chloroform; and cyclohexane. Of these, methyl ethyl ketone and cyclohexanone are suitably employed.

The weight average molecular weight of the polyurethane resin is desirably equal to or greater than 10,000 and equal to or lower than 200,000 (in the present invention, "equal to or greater than 10,000 and equal to or lower than 200,000" is sometimes stated as "10,000 to 200,000," identical below), preferably 40,000 to 100,000, and more preferably, 50,000 to 90,000. It is desirable for the polyurethane resin to have a weight average molecular weight of equal to or greater than 10,000 in that a good storage property can be achieved. A weight average molecular weight of equal to or lower than 200,000 is desirable in that good dispersibility can be achieved.

Examples of methods of controlling the weight average molecular weight to within the above range are given below.

For example, the weight average molecular weight can be adjusted by microadjusting the molar ratio of glycol-derived OH groups and diisocyanate-derived NCO groups and employing a reaction solvent.

Examples of the reaction catalyst are organic metal compounds such as dibutyltin dilaurate; tertiary amines such as triethylamine and triethylenediamine; and metal salts such as sodium acetate and zinc stearate. Dibutyltin dilaurate is a desirable example.

Other examples include adjusting the solid component concentration during the reaction, reaction temperature, reaction solvent, reaction period, and the like to adjust the weight average molecular weight.

The molecular weight distribution (Mw/Mn) of the polyurethane resin is desirably 1.0 to 2.5, preferably 1.5 to 2.0. A molecular weight distribution of equal to or lower than 2.5 is desirable in that the composition distribution is low and good dispersibility can be achieved.

The concentration of urethane groups in the polyurethane resin is desirably 2.5 to 4.5 mmoles/g, preferably 3.0 to 4.0 mmoles/g. A urethane group concentration of equal to or greater than 2.5 mmoles/g is desirable in that good durability can be achieved without a decrease in the Tg of the coating. A concentration of equal to or lower than 4.5 mmoles/g is desirable in that good solvent solubility and dispersibility can be achieved, making it possible to adjust the polyol content and facilitating control of the molecular weight.

The glass transition temperature (Tg) of the polyurethane resin is desirably 80 to 200° C., preferably 90 to 160° C. A glass transition temperature of equal to or higher than 80° C. is desirable in that good coating strength can be achieved and durability and storage properties can be enhanced. A glass transition temperature of equal to or lower than 200° C. is desirable in that good calendering moldability and electromagnetic characteristics can be achieved.

The polar group content is desirably $1\times10^{-5}$ to $2\times10^{-3}$ eq/g, preferably $1\times10^{-5}$ to $1\times10^{-3}$ eq/g, and more preferably, $1\times10^{-5}$ to $5\times10^{-4}$ eq/g. A polar group content of equal to or greater than $1\times10^{-5}$ eq/g is desirable in that adequate strength of adsorption to the magnetic powder and good dispersibility can be achieved. A polar group content of equal to or lower than $2\times10^{-3}$ eq/g is desirable in that good solvent solubility can be achieved.

The polyurethane resin can be obtained employing the compound denoted by general formula (1) as the polyol, thus having a polar group in the form of —$SO_3M$. In this context, M is defined as above.

The polyurethane resin may also comprise another polar group.

Examples of other desirable polar groups are —$OSO_3M$, —$PO_3M_3$, and —COOM. Among them, —$OSO_3M$ is preferred. M in these groups denotes a hydrogen atom or a monovalent cation. Examples of monovalent cations are alkali metals and ammonium.

Hydroxyl (OH) groups can be contained in the polyurethane resin. From 2 to 20 hydroxyl groups are desirably contained per molecule, with 3 to 15 hydroxyl groups being preferred. A number of hydroxyl groups within this range is desirable in that it can enhance the reactivity with the isocyanate curing agent, increasing the strength and durability of the coating. It can also enhance solvent solubility, improving dispersibility.

The binder is desirably added in a quantity of equal to or greater than 5 weight parts and equal to or less than 30 weight parts, preferably equal to or greater than 10 weight parts and equal to or less than 20 weight parts, per 100 weight parts of ferromagnetic powder, in the magnetic layer. The polyurethane resin obtained with a diol component in the form of the compound denoted by general formula (1) desirably constitutes equal to or greater than 50 weight percent, preferably 60 to 100 weight percent, and more preferably, 70 to 100 weight percent of the binder as a whole. The polyurethane resin content in the binder that falls within this range is desirable in that it can further enhance dispersibility.

Other Components

Additives may be added to the magnetic layer as needed.

Examples of such additives are: abrasives, lubricants, dispersing agents, dispersing adjuvants, antifungal agents, antistatic agents, oxidation inhibitors, solvents, and carbon black. Examples of additives are: molybdenum disulfide, tungsten disulfide, graphite, boron nitride, graphite fluoride, silicone oil, polar group-comprising silicone, fatty acid-modified silicone, fluorosilicone, fluoroalcohols, fluoroesters, polyolefin, polyglycol, polyphenyl ether, phenyl phosphonic acid, benzyl phosphonic acid, phenethyl phosphonic acid, $\alpha$-methylbenzylphosphonic acid, 1-methyl-1-phenethylphosphonic acid, diphenylmethylphosphonic acid, biphenylphosphonic acid, benzylphenylphosphonic acid, $\alpha$-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, other aromatic ring-comprising organic phosphonic acids, alkali metal salts thereof, octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, other alkyl phosphonoic acid, alkali metal salts thereof, phenyl phosphoric acid, benzyl phosphoric acid, phenethyl phosphoric acid, $\alpha$-methylbenzylphosphoric acid, 1-methyl-1-phenethylphosphoric acid, diphenylmethylphosphoric acid, diphenyl phosphoric acid, benzylphenyl phosphoric acid, $\alpha$-cumyl phosphoric acid, toluyl phosphoric acid, xylyl phosphoric acid, ethylphenyl phosphoric acid, cumenyl phosphoric acid, propylphenyl phosphoric acid, butylphenyl phosphoric acid, heptylphenyl phosphoric acid, octylphenyl phosphoric acid, nonylphenyl phosphoric acid, other aromatic phosphoric esters, alkali metal salts thereof, octyl phosphoric acid, 2-ethylhexylphosphoric acid, isooctyl phosphoric acid, isononyl phosphoric acid, isodecyl phosphoric acid, isoundecyl phosphoric acid, isododecyl phosphoric acid, isohexadecyl phosphoric acid, isooctyldecyl phosphoric acid, isoeicosyl phosphoric acid, other alkyl ester phosphoric acids, alkali metal salts thereof, alkylsulfonic acid ester, alkali metal salts thereof, fluorine-containing alkyl sulfuric acid esters, alkali metal salts thereof, lauric acid, myristic acid, palmitic acid, stearic acid, behenic acid, butyl stearate, oleic acid, linolic acid, linoleic acid, elaidic acid, erucic acid, other monobasic fatty acids comprising 10 to 24 carbon atoms (which may contain an unsaturated bond or be branched), metal salts thereof, butyl stearate, octyl stearate, amyl stearate, isooctyl stearate, octyl myristate, butyl laurate, butoxyethyl stearate, anhydrosorbitan monostearate, anhydrosorbitan tristearate, other monofatty esters, difatty esters, or polyfatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched), alkoxyalcohol having 12 to 22 carbon atoms (which may contain an unsaturated bond or be branched) or a monoalkyl ether of an alkylene oxide polymer, fatty acid amides with 2 to 22 carbon atoms, and aliphatic amines with 8 to 22 carbon atoms. Compounds having aralkyl groups, aryl groups, or alkyl groups substituted with groups other than hydrocarbon groups, such as nitro groups, F, Cl, Br, $CF_3$, $CCl_3$, $CBr_3$, and other halogen-containing hydrocarbons in addition to the above hydrocarbon groups, may also be employed.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.), which is expressly incorporated herein by reference in its entirety.

The above-described dispersing agents, lubricants and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

Specific examples of these additives are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co., Ltd.; NJLUB OL manufactured by New Japan Chemical Co. Ltd.; TA-3 manufactured by Shin-Etsu Chemical Co. Ltd.; Armide P manufactured by Lion Corporation; Duomine TDO manufactured by Lion Corporation; BA-41 G manufactured by Nisshin OilliO, Ltd.; and Profan 2012E, Newpole PE61 and Ionet MS-400 manufactured by Sanyo Chemical Industries, Ltd.

A known organic solvent can be employed as the solvent in the magnetic layer. Examples of organic solvents are, in any ratio: ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutylalcohol, isopropylalcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylenechlorhydrin, and dichlorobenzene; N,N-dimethylformamide; and hexane. The compound denoted by general formula (1) can exhibit good solubility in the above various organic solvents employed in magnetic recording media, thereby further enhancing dispersibility. Since it can exhibit particularly good solubility in ketone solvents, a ketone solvent is desirably employed as the organic solvent, with the use of methyl ethyl ketone and cyclohexanone being preferred.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. Preferably the same type of organic solvent is employed in the magnetic layer and in the nonmagnetic layer. However, the amount added may be varied. The stability of coating is increased by using a solvent with a high surface tension (such as cyclohexanone or dioxane) in the nonmagnetic layer. Specifically, it is preferable that the arithmetic mean value of the upper layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

Different types and quantities of the dispersing agents, lubricants, and surfactants employed in the magnetic layer may be employed in the magnetic layer and in the nonmagnetic layer, described further below. Although not limited to the examples given here, the compound denoted by general formula (1) and the above-described dispersing agent have the property of adsorbing or bonding by means of polar groups. The polar groups primarily adsorb or bond to the surface of ferromagnetic powder in the magnetic layer and primarily adsorb or bond to the surface of the nonmagnetic powder in the nonmagnetic layer, described further below. It is thought that once a compound has adsorbed, it tends not to dissociate from the surface of the metal, metal compound, or the like. Accordingly, since the ferromagnetic powder surface or nonmagnetic powder surface described further below is covered with alkyl groups, aromatic groups, and the like, affinity for the binder resin component of the ferromagnetic powder or nonmagnetic powder can increase, and the dispersion stability of the ferromagnetic powder or nonmagnetic powder can improve. It is also possible to employ lubricants in the form of fatty acids having different melting points in the magnetic layer and nonmagnetic layer to control seepage onto the surface because of their presence in a free state; to control seepage onto the surface using esters having different boiling points or polarities; to enhance the stability of the coating by adjusting the quantity of surfactants; and to enhance the lubricating effect by adding a large quantity of lubricant to the nonmagnetic layer. All or some part of the additives employed in the present invention can be added in any of the steps during manufacturing of a magnetic layer or nonmagnetic layer coating liquid. For example, there are times when they are mixed with the ferromagnetic powder prior to the kneading step; times when they are added during the kneading step of the magnetic powder, binder, and solvent; times when they are added during the dispersing step; times when they are added after the dispersing step; and times when they are added immediately prior to coating.

Carbon black may be added to the magnetic layer as needed. Examples of types of carbon black are: furnace black for rubber, thermal for rubber, black for coloring, and acetylene black. Carbon black is preferably employed in the magnetic layer by optimizing the characteristics described below, and two or more types of carbon black may be employed together to enhance their effects.

The carbon black has a specific surface of, for example 100 to 500 m$^2$/g, preferably 150 to 400 m$^2$/g, a DBP oil absorption capacity of, for example, 20 to 400 ml/100 g, preferably 30 to 200 ml/100 g, a particle diameter of, for example 5 to 80 nm (m μ), preferably 10 to 50 nm (m μ), further preferably, 10 to 40 nm (m μ). It is preferable for the carbon black that the pH is 2 to 10, the moisture content is 0.1 to 10 percent, and the tap density is 0.1 to 1 g/ml.

Specific examples of carbon black are: BLACK PEARLS 2000, 1300, 1000, 900, 800, 880, 700 and VULCAN XC-72 from Cabot Corporation; #80, #60, #55, #50 and #35 manufactured by Asahi Carbon Co., Ltd.; #3050B, #3150B, #3250B, #3750B, #3950B, #950, #650B, #970B, #850B, MA-600, MA-230, #4000, and #410 from Mitsubishi Chemical Corporation; CONDUCTEX SC, RAVEN 8800, 8000, 7000, 5750, 5250, 3500, 2100, 2000, 1800, 1500, 1255, and 1250 from Columbia Carbon Co., Ltd.; and Ketjen Black EC from Ketjen Black International Co., Ltd.

The carbon black employed may be surface-treated with a dispersing agent or grafted with resin, or have a partially graphite-treated surface. The carbon black may be dispersed in advance into the binder prior to addition to the coating liquid. For example, the *Carbon Black Handbook* compiled by the Carbon Black Association, which is expressly incorporated herein by reference in its entirety, may be consulted for types of carbon black suitable for use in the present invention.

These carbon blacks may be used singly or in combination. When employing carbon black, the quantity preferably ranges from 0.1 to 30 weight percent with respect to the weight of the magnetic powder. In the magnetic layer, carbon black can work to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer.

2. Nonmagnetic Layer

In the magnetic recording medium of the present invention, a nonmagnetic layer, comprising a nonmagnetic powder and a binder, may be present between the nonmagnetic support and the magnetic layer. When a nonmagnetic layer is present, the same binder as in the magnetic layer may be employed in the nonmagnetic layer. However, this is not a limitation. The compound denoted by general formula (1) may also be added as a nonmagnetic layer component.

The nonmagnetic powder employed in the nonmagnetic layer may be an organic or inorganic substance. As needed, carbon black may be mixed with nonmagnetic powder in the nonmagnetic layer. To the extent that the nonmagnetic layer remains substantially nonmagnetic, magnetic powder can be employed in the nonmagnetic layer.

Nomnagnetic Powder

Both organic and inorganic substances may be employed as the nonmagnetic powder in the nomnagnetic layer. Examples of inorganic substances are metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 1 μm, more preferably from 40 to 100 nm. A crystallite size falling within a range of 4 nm to 1 μm is desirable in that it facilitates dispersion and imparts a suitable surface roughness. The average particle diameter of the nonmagnetic powder preferably ranges from 5 nm to 2 μm. As needed, nonmagnetic powders of differing average particle diameter may be combined; the same effect may be achieved by broadening the particle distribution of a single nonmagnetic powder. The particularly preferred average particle diameter of the nonmagnetic powder ranges from 10 to 200 nm. Within a range of 5 nm to 2 μm, dispersion is good and a suitable surface roughness can be achieved; the above range is preferred.

The specific surface area of the nonmagnetic powder preferably ranges from 1 to 100 m$^2$/g, more preferably from 5 to 70 m$^2$/g, and further preferably from 10 to 65 m$^2$/g. Within the specific surface area ranging from 1 to 100 m$^2$/g, a nonmagnetic layer with suitable surface roughness can be achieved and dispersion of the nonmagnetic powder is possible with the desired quantity of binder; the above range is preferred.

Oil absorption capacity using dibutyl phthalate (DBP) of the nonmagnetic powder preferably ranges from 5 to 100 mL/100 g, more preferably from 10 to 80 mL/100 g, and further preferably from 20 to 60 mL/100 g. The specific gravity preferably ranges from 1 to 12, more preferably from 3 to 6. The tap density preferably ranges from 0.05 to 2 g/mL, more preferably from 0.2 to 1.5 g/mL. A tap density falling within a range of 0.05 to 2 g/mL can reduce the amount of scattering particles, thereby facilitating handling, and tends to prevent solidification to the device.

The pH of the nonmagnetic powder preferably ranges from 2 to 11, more preferably from 6 to 9. When the pH falls within a range of 2 to 11, the coefficient of friction does not become high at high temperature or high humidity, or due to the freeing of fatty acids.

The moisture content of the nomnagnetic powder preferably ranges from 0.1 to 5 weight percent, more preferably from 0.2 to 3 weight percent, and further preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 μmol/m$^2$, more preferably from 2 to 15 μmol/m$^2$. The heat of wetting in 25° C. water of the nonmagnetic powder is preferably within a range of 20 to 60 μJ/cm$^2$ (approximately 200 to 600 erg/cm$^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9.

The surface of these nonmagnetic powders preferably contains $Al_2O_3$, $SiO_2$, $TiO_2$, $ZrO_2$, $SnO_2$, $Sb_2O_3$, and $ZnO$ by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Specific examples of nonmagnetic powders suitable for use in the nonmagnetic layer are: Nanotite from Showa Denko K. K.; HIT-100 and ZA-GI from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, T-600B, T-100F and T-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$, desirably 30 to 50 kg/mm$^2$ to adjust head contact. It can be measured with a thin film hardness meter (HMA-400 made by NEC Corporation) using a diamond triangular needle with a tip radius of 0.1 micrometer and an edge angle of 80 degrees as indenter tip. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is preferably 100 to 500 m$^2$/g, more preferably 150 to 400 m$^2$/g. The DBP oil absorption capability is preferably 20 to 400 mL/100 g, more preferably 30 to 200 mL/100 g. The particle diameter of the carbon black is preferably 5 to 80 nM, more preferably 10 to 50 nm, and further preferably, 10 to 40 nm. It is preferable that the pH of the carbon black is 2 to 10, the moisture content is 0.1 to 10 percent, and the tap density is 0.1 to 1 g/mL.

Specific examples of types of carbon black employed in the nonmagnetic layer are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Ketjen Black International Co., Ltd.

The carbon black employed may be surface-treated with a dispersant or grafted with resin, or have a partially graphite-treated surface. The carbon black may be dispersed in advance into the binder prior to addition to the coating liquid. The quantity of the carbon black is preferably within a range not exceeding 50 weight percent of the inorganic powder as well as not exceeding 40 weight percent of the total weight of the nonmagnetic layer. These carbon blacks may be used singly or in combination. For example, the *Carbon Black Handbook* compiled by the Carbon Black Association may be consulted for types of carbon black suitable for use in the nonmagnetic layer.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto.

3. Nonmagnetic Support

Known biaxially-oriented polyethylene terephthalate, polyethylene naphthalate, polyamide, polyamide-imide, and aromatic polyamide are examples of the nonmagnetic support. Of these, polyethylene terephthalate, polyethylene naphthalate, and polyamide are desirable.

The support may be subjected to corona discharge, plasma processed, treated to induce adhesion, and heated in advance. The surface roughness of a nonmagnetic support that can be employed in the present invention is desirably a center average roughness Ra of 3 to 10 nm at a cutoff value of 0.25 mm.

4. Smoothing Layer

A smoothing layer may be provided in the magnetic recording medium of the present invention. A smoothing layer is a layer that is used to bury protrusions on the surface of the nonmagnetic support. In a magnetic recording medium in which the magnetic layer is provided on a nonmagnetic support, the smoothing layer can be provided between the nonmagnetic support and the magnetic layer. In a magnetic recording medium in which a nonmagnetic layer and a magnetic layer are provided in that order on a nonmagnetic support, the smoothing layer can be provided between the nonmagnetic support and the nonmagnetic layer.

The smoothing layer can be formed by curing a radiation-curable compound by irradiation with radiation. The term "radiation-curable compound" means a compound that has the property of beginning to polymerize or crosslink, and cures into a polymer, when irradiated with radiation such as UV radiation or an electron beam.

5. Backcoat Layer

Generally, a magnetic tape employed to record computer data is sometimes required to have greater repeat running durability than an audio tape or a video tape. To maintain such high storage stability, a backcoat layer can be provided on the opposite surface of the nonmagnetic support from the surface on which the nonmagnetic layer and magnetic layer are provided. The backcoat layer coating liquid can be prepared by dispersing binder and granular components such as abrasives and antistatic agents in an organic solvent. Granular components in the form of various inorganic pigments and carbon black can be employed. For example, a resin in the form of nitrocellulose, phenoxy resin, vinyl chloride resin, or polyurethane can be employed singly, or in the form of a mixture of the above, as the binder.

6. Layer Structure

In the magnetic recording medium of the present invention, the thickness of the radiation-curable compound layer desirably falls within a range of 0.3 to 1.0 micrometer. The thickness of the nonmagnetic support is desirably 3 to 80 micrometers. When an undercoat layer is provided between the nonmagnetic support and the nonmagnetic layer or magnetic layer, the thickness of the undercoat layer is desirably 0.01 to 0.8 micrometer, preferably 0.02 to 0.6 micrometer. The thickness of the backcoat layer provided on the opposite surface of the nonmagnetic support from the surface on which the nonmagnetic layer and magnetic layer are provided is desirably 0.1 to 1.0 micrometer, preferably 0.2 to 0.8 micrometer.

The thickness of the magnetic layer is preferably optimized based on the saturation magnetization of the head employed, the length of the head gap, and the recording signal band. It is generally ranges from 0.01 to 0.10 µm, preferably 0.02 to 0.08 µm, more preferably, 0.03 to 0.08 µm. The thickness variation in the magnetic layer is preferably within ±50 percent, more preferably within ±40 percent. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 µm, preferably 0.3 to 2.5 µm, and more preferably, 0.4 to 2.0 µm. The nonmagnetic layer in the magnetic recording medium of the present invention produces its effect so long as it is substantially nonmagnetic. When small quantities of magnetic powder are present in the nonmagnetic layer, either as impurities or intentionally, for example, the present invention still exhibits its effect and the structure can still be considered to be essentially identical to that of the magnetic recording medium of the present invention. The phrase "essentially identical" means the residual magnetic flux density of the nonmagnetic layer does not exceed 10 mT (100 G) or the coercivity does not exceed 7.96 kA/m (100 Oe), and desirably means that there is no residual magnetic flux density or coercivity.

7. Manufacturing Method

The process for manufacturing magnetic layer and nonmagnetic layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) are kneaded in a range of 15 to 500 weight parts per 100 weight parts of the ferromagnetic powder. Details of the kneading process are described in Japanese Unexamined Patent Publication (KOKAI) Heisei Nos. 1-106338 and 1-79274. The contents of these publications are incorporated herein by reference in their entirety. Further, glass beads may be employed to disperse the magnetic layer and nonmagnetic layer coating liquids, with a dispersing medium with a high specific gravity such as zirconia beads, titania beads, and steel beads being suitable for use as the glass beads. The particle diameter and fill ratio of these dispersing media can be optimized for use. A known dispersing device may be employed.

In the method of manufacturing the magnetic recording medium, for example, the magnetic layer can be formed by coating a magnetic layer coating liquid to a prescribed film thickness on the surface of a nonmagnetic support while the nonmagnetic support is running. Multiple magnetic layer coating liquids can be successively or simultaneously coated in a multilayer coating, and the nonmagnetic layer coating liquid and the magnetic layer coating liquid can be successively or simultaneously applied in a multilayer coating.

Coating machines suitable for use in coating the magnetic layer and nonmagnetic layer coating liquids are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K., which is expressly incorporated herein by reference in its entirety, may be referred to in this regard.

For a magnetic tape, the coating layer that is formed by applying the magnetic layer coating liquid can be magnetic field orientation processed using cobalt magnets or solenoids on the ferromagnetic powder contained in the coating layer. In the case of a disk, adequately isotropic orientation can sometimes be achieved with no orientation without using an orienting device. However, the diagonal arrangement of cobalt magnets in alternating fashion or the use of a known random orienting device such as a solenoid to apply an a.c. magnetic field is desirable. In the case of a ferromagnetic metal powder, the term "isotropic orientation" generally means randomness in the two in-plane dimensions, but can also be three-dimensional randomness when the vertical component is included. In the case of hexagonal ferrite, three-dimensional randomness in the in-plane directions and the vertical direction is generally readily achieved, but in-plane two-dimensional randomness is also possible. A known method such as magnets with opposite poles positioned opposite each other can also be employed to impart isotropic magnetic characteristics in a circumferential direction by effecting vertical orientation. When conducting particularly high-density recording, vertical orientation is desirable. Spin coating can also be employed to effect circumferential orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

Following drying, the coating layer is normally subjected to a surface-smoothing treatment. Super calender rolls or the like can be employed in the surface-smoothing treatment. Conducting a surface—smoothing treatment can eliminate small holes produced by the removal of solvent during drying and improve the fill rate of ferromagnetic powder in the magnetic layer, thereby yielding a magnetic recording medium affording better electromagnetic characteristics.

Heat-resistant plastic rolls of epoxy, polyimide, polyamide, polyamide-imide, or the like can be employed as the calendering rolls. Processing can also be conducted with metal rolls. The surface of the magnetic recording medium of the present invention preferably has good surface smoothness, with a center surface average roughness falling within a range of 0.1 to 4.0 nm, desirably 0.5 to 3.0 mm, at a cutoff value of 0.25 mm. One example of a method of smoothing the surface is calendering. Calendering is desirably conducted under conditions such that the calender roll temperature falls, for example, within a range of 60 to 100° C., desirably within a range of 70 to 100° C., and preferably, within a range of 80 to 100° C., and the pressure falls, for example, within a range of 100 to 500 kg/cm, desirably within a range of 200 to 450 kg/cm, and preferably, within a range of 300 to 400 kg/cm.

The method of conducting a heat treatment in web form while handling the tape at low tension and the method of conducting a heat treatment (thermoprocessing) with the tape in stacked layers—either in bulk or assembled into cassettes—are known as means of diminishing the thermal shrinkage rate. Both may be employed. The former is little affected by backcoat layer protrusion transfer, but does not readily achieve major reductions in the thermal shrinkage rate. By contrast, thermoprocessing greatly improves the thermal shrinkage rate, but is greatly affected by backcoat layer surface protrusion transfer, sometimes resulting in magnetic surface roughness, output dropoff, and increased noise. In particular, a magnetic recording medium achieving high output and low noise can be obtained by thermoprocessing. The magnetic recording medium obtained can be cut to desired size for use with a cutter or punching machine.

8. Physical Characteristics

The saturation magnetic flux density of the magnet layer in the magnetic recording medium of the present invention is preferably 100 to 300 T·m (approximately 1,000 to 3,000 G). The coercivity (Hr) of the magnetic layer is preferably 143.3 to 318.4 kA/m (approximately 1,800 to 4,000 Oe), more preferably 159.2 to 278.6 kA/m (approximately 2,000 to 3,500 Oe). Narrower coercivity distribution is preferable. The SFD and SFDr are preferably equal to or lower than 0.6, more preferably equal to or lower than 0.2.

The coefficient of friction of the magnetic recording medium of the present invention relative to the head is desirably equal to or less than 0.5 and preferably equal to or less than 0.3 at temperatures ranging from −10° C. to 40° C. and humidity ranging from 0 percent to 95 percent, and the charge potential preferably ranges from −500 V to +500 V. The modulus of elasticity at 0.5 percent extension of the magnetic layer preferably ranges from 0.98 to 19.6 GPa (approximately 100 to 2,000 kg/mm$^2$) in each in-plane direction. The breaking strength preferably ranges from 98 to 686 MPa (approximately 10 to 70 kg/mm$^2$). The modulus of elasticity of the magnetic recording medium preferably ranges from 0.98 to 14.7 GPa (approximately 100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (the peak loss elastic modulus based on measurement of dynamic viscoelasticity at 110 Hz) of the magnetic layer preferably ranges from 50 to 180° C., and that of the nonmagnetic layer preferably ranges from 0 to 180° C. The loss elastic modulus preferably falls within a range of $1 \times 10^7$ to $8 \times 10^8$ Pa (approximately $1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coating layers, including both the nomnagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

The center surface average roughness Ra of the magnetic layer as measured by digital optical profimeter (TOPO-3D made by WYKO) is desirably equal to or less than 4.0 nm, preferably equal to or less than 3.0 nm, and more preferably, equal to or less than 2.0 nm. The maximum height $SR_{max}$ of the magnetic layer is desirably equal to or less than 0.5 micrometer. The ten point average roughness SRz is desirably equal to or less than 0.3 micrometer. The center surface peak height SRp is desirably equal to or less than 0.3 micrometer. The center surface valley depth SRv is equal to or less than desirably 0.3 micrometer. The center surface area ratio SSr is desirably 20 to 80 percent. And the average wavelength SλA is desirably 5 to 300 micrometers. The number of surface protrusions 0.01 to 1 micrometer in height on the magnetic layer can be set to any value within the range of 0 to 2,000; this is desirable to optimize electromagnetic characteristics and the coefficient of friction. These can be readily controlled by controlling the surface properties by means of the filler used in the support, controlling the particle size and quantity of powder added to the magnetic layer, controlling the surface configuration of the rolls employed in calendering, and the like. Curling is desirably kept to within ±3 mm.

It will be readily understood that these physical characteristics can be varied between the nonmagnetic layer and the magnetic layer in the magnetic recording medium of the present invention to achieve a specific objective. For example, the elastic modulus of the magnetic layer can be raised to enhance storage stability, while the elastic modulus of the nonmagnetic layer can be lowered below that of the magnetic layer to improve the head contact of the magnetic recording medium.

The head that is used to reproduce a signal that has been magnetically recorded on the magnetic recording medium of the present invention is not specifically limited. An MR head is desirable. When an MR head is used to reproduce the magnetic recording medium of the present invention, the MR head is not specifically limited. For example, a GMR head or a TMR head may be employed. Nor is the head employed in magnetic recording specifically limited. The saturation magnetization level is desirably equal to or higher than 1.0 T, preferably equal to or higher than 1.5 T.

Method of Modifying Surface of Magnetic Powder and Magnetic Coating Material

The present invention further relates to a method of modifying a surface of a magnetic powder, comprising mixing a magnetic powder with the compound denoted by general formula (1), and to a magnetic coating material comprising a magnetic powder, a binder, and a compound denoted by general formula (1).

The compound denoted by general formula (1) is thought to enhance the affinity of magnetic powder for solvent and for binder components by adsorbing to the surface of the magnetic powder. Since the surface of magnetic power is generally hydrophilic to a relatively high degree, it has low affinity for the organic solvents such as ketone solvents such as cyclohexanone and methyl ethyl ketone that are employed as solvents in magnetic coating materials, or for hydrophobic binder components. This low affinity causes a drop in the dispersibility of magnetic powder. In contrast, the compound denoted by general formula (1) comprises a sulfonic acid (salt) group, which is a relatively strong polar group. It thus can strongly adsorb to the surface of magnetic powder particles. It can also have a structure comprising branched OH groups, which are thought to impart adequate solvent affinity to the surface of magnetic powder and thereby improve the dispersibility of magnetic powder. In a magnetic coating material containing binder in the form of polyurethane resin obtained using the compound denoted by general formula (1) as a diol component, the good affinity between the compound denoted by general formula (1) and the polyurethane resin can further enhance dispersibility, as set forth above. For example, as indicated in Examples further below, the compound denoted by general formula (1) has been determined to modify the surface of the magnetic powder based on the fact that the level of adsorption of binder to the magnetic powder in the magnetic coating material changes based on whether or not the compound denoted by general formula (1) is present. The fact that the above compound adheres to the surface of magnetic powder has been confirmed based on the fact that the concentration of the compound measured in the supernatant when the above compound is mixed with magnetic powder is lower than the concentration added.

The compound denoted by general formula (1) can be employed singly or in combination of two or more, and can be employed together with other compounds having surface-modifying effects.

The compound denoted by general formula (1) can improve the dispersibility of magnetic powder in magnetic coating materials by modifying the magnetic powder surface. Accordingly, the compound is desirably employed as a dispersing agent in magnetic coating materials.

In the magnetic coating material of the present invention, magnetic powders can disperse to a high degree of dispersion. Accordingly, the magnetic coating material of the present invention is suitable as a coating liquid for forming a magnetic layer of a magnetic recording medium in which high dispersibility is desired.

Details of the method of modifying a surface of a magnetic powder and the magnetic coating material of the present invention are as set forth above with regard to the magnetic recording medium of the present invention.

EXAMPLES

The present invention will be described in detail below based on Examples. However, the present invention is not limited to the examples. The "parts" given in Examples are weight parts unless specifically stated otherwise.

Synthesis Examples 1

Synthesis of Sulfonic Acid (Salt) Group-Containing Diol (Example Compound S-1)

To 250 weight parts of water were added 100 weight parts of 2-aminoethanesulfonic acid and 33.5 weight parts of lithium hydroxide monohydrate and the mixture was stirred for 30 minutes at 45° C. To this were added 156 weight parts of 1,2-butyleneoxide and the mixture was further stirred for 2 hours at 45° C. The reaction produced taurine lithium salt. Next, 400 weight parts of toluene were added, the mixture was stirred for 10 minutes, the mixture was allowed to stand, and the lower layer was removed. The lower layer obtained was solidified and dried, yielding lithium salt of bis(2-hydroxybutyl)aminoethanesulfonic acid (Example Compound S-1). $^1$H-NMR data and their assignments are given below for the product. A 400 MHz NMR (AvanceII-400 made by Bruker) was employed for $^1$H-NMR measurement in Examples.

(S-1): $^1$H NMR ($D_2O$=4.75 ppm) δ(ppm)=3.68 (2H, m), 3.10 (2H, m), 2.59 (2H, m), 2.40 (4H, m), 1.45 (4H, m), 0.89 (6H, t).

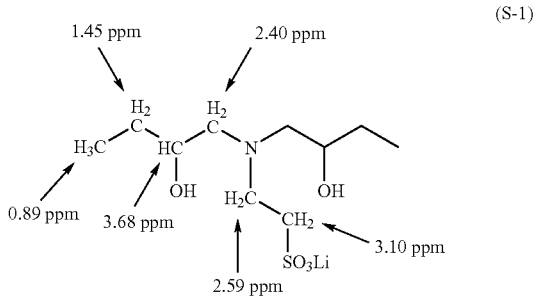

(S-1)

Synthesis Example 2

Synthesis of Sulfonic Acid (Salt) Group-Containing Diol (Example Compound S-2)

With the exception that the epoxy compound employed was changed to butylglycidylether, a lithium salt of bis(2-hydroxy-3-butoxypropyl)aminoethanesulfonic acid was obtained by the same operation as in Synthesis Example 1. $^1$H-NMR data and their assignments are given below for the product.

(S-2): $^1$H NMR ($D_2O$=4.75 ppm) δ(ppm)=3.84 (2H, m), 3.55-3.30 (8H, m), 3.38 (2H, m), 2.95 (4H, m), 2.51 (2H, m), 1.49 (4H, m), 1.27 (4H, m), 0.83 (6H, t).

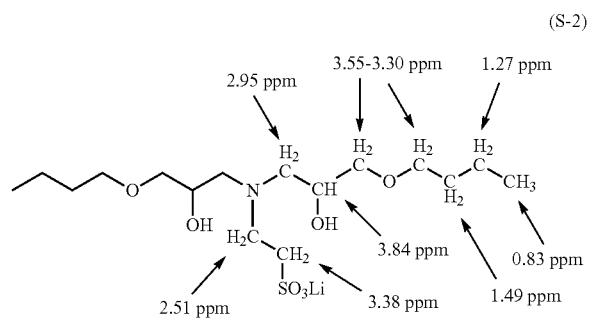

(S-2)

Synthesis Example 3

Synthesis of Sulfonic Acid (Salt) Group-Containing Diol (Example Compound S-7)

To 250 weight parts of water were added 100 weight parts of m-aminobenzenesulfonic acid and 24 weight parts of lithium hydroxide monohydrate and the mixture was stirred for 30 minutes at 45° C. To this were added 112 weight parts of 1,2-butyleneoxide and the mixture was stirred for another 2 hours at 45° C. Next, 400 weight parts of toluene were added, the mixture was stirred for 10 minutes, the mixture was allowed to stand, and the lower layer was removed. The lower layer obtained was solidified and dried, yielding the target compound.

Synthesis Example 4

Synthesis of Sulfonic Acid (Salt) Group-Containing Diol (Example Compound S-9)

With the exception that the alkali employed was changed to potassium hydroxide, the target compound was obtained by the same operation as in Synthesis Example 3.

Synthesis Example 5

Synthesis of Sulfonic Acid (Salt) Croup-Containing Diol (Example Compound S-8)

With the exception that the alkali employed was changed to sodium hydroxide, the target compound was obtained by the same operation as in Synthesis Example 3.

Molecular weights were calculated from the structural formulas determined from NMR identification results for the compounds synthesized in Synthesis Examples 1 and 2. Molecular weights were calculated in the same manner for the compounds synthesized in Synthesis Examples 3 to 5. The molecular weights of Synthesis Examples 1 to 5 and their preparation ratios in the synthesis are given in Table 1. Taurine is given in Table 1 as a comparative compound.

TABLE 1

| Sulfonic acid (salt) group-containing diol | Sulfonic acid (salt) group-containing amiine (Quantity employed = 1 mole for each) | Epoxy compounud (Quantity employed) | Molecular weight |
|---|---|---|---|
| Synthesis Example 1 | Li salt of taurine | 1,2-butyleneoxide (2 moles) | 243.3 |
| Synthesis Example 2 | Li salt of taurine | Butylglycidylether (2 moles) | 391.5 |
| Synthesis Example 3 | Li salt of m-aminobenzenesulfonic acid | 1,2-butyleneoxide (2 moles) | 323.3 |
| Synthesis Example 4 | K salt of m-aminobenzenesulfonic acid | 1,2-butyleneoxide (2 moles) | 355.5 |
| Synthesis Example 5 | Na salt of m-aminobenzenesulfonic acid | 1,2-butyleneoxide (2 moles) | 339.4 |
| Comparative compound | Taurine | — | 125.2 |

Confirmation of Surface Adsorption

An 8.0 weight part quantity of the acicular ferromagnetic powder employed in Examples set forth further below and 0.13 weight part of each of the compounds synthesized in Synthesis Examples 1 to 5 were suspended in 3.3 weight parts of cyclohexanone. To the suspension were added 27 weight parts of zirconia beads (made by Nikkato) and the mixture was dispersed for 6 hours. When measured by neutralization titration, the dispersions of the various compounds synthesized in Synthesis Examples 1 to 5 were below the detection threshold. As a result, it was confirmed that the compounds synthesized in Synthesis Examples 1 to 5 had all adsorbed to the surface of the ferromagnetic powder.

Synthesis Example 6

Synthesis of Polyurethane Resin

A diol component with the composition indicated in Table 2 and a reaction catalyst in the form of di-n-butyltin laurate were charged to a container that had been equipped with reflux condenser and stirrer and had been backfilled in advance with nitrogen to obtain a 50 weight percent solution in cyclohexanone. The solution was then stirred for 1 hour at 60° C. under a nitrogen flow. The diisocyanate component indicated in Table 2 was then added and the mixture was reacted with heating for 6 hours at 90° C. to obtain a polyurethane resin PU-A.

The reaction catalyst di-n-butyltin laurate was added in a proportion of 0.01 weight part to the polymer components (total quantity of polyol and polyisocyanate).

Table 2 gives the weight average molecular weight and the ratio of the weight average molecular weight/number average molecular weight (Mw/Mn) of the polyurethane obtained. The weight average molecular weight of the polyurethane was obtained by standard polystyrene conversion using DMF (dimethylformamide) solution.

The sulfonic acid (salt) concentration (eq/g) is also given. The sulfonic acid (salt) concentration was determined as follows. The quantity of elemental sulfur determined from the area of the elemental sulfur (S) peak in X-ray fluorescent analysis was converted to the quantity of elemental sulfur per gram of polyurethane resin.

acicular ratio: 3.5, σs:120 Am$^2$/kg(120 emu/g), major axis length: see Table 3

(2) Hexagonal Plate-Shaped Ferrite Powder

Composition: Ba 91 atomic %, Fe 8 atomic %, Co 0.5 atomic %, Zn 0.5 atomic %, Hc: 175 kA/m(2200 Oe), specific surface area: 55 m$^2$/g, plate ratio: 3.5, σs:51 Am$^2$/kg(51 emu/g), plate diameter: see Table 3

(3) Spherical Iron Nitride Powder

Composition: Fev88 atomic %, N 8 atomic %, Y 4 atomic %, Hc: 175 kA/m(2200 Oe), specific surface area: 56 m$^2$/g, σs:100 Am$^2$/kg(100 emu/g), particle diameter: see Table 3

| Preparation of nonmagnetic layer coating liquid | |
| --- | --- |
| Nonmagnetic inorganic powder (α-iron oxide, surface treatment agent: Al$_2$O$_3$, SiO$_2$, major axis diameter: 0.15 μm, tap density: 0.8, acicular ratio: 7, BET specific surface area: 52 m$^2$/g, pH: 8, DBP oil absorption capacity: 33 g/100 g) | 85 parts |

TABLE 2

| | Diol and diisocyanate employed in polyurethane synthesis (molar ratio) | | | | | | |
| --- | --- | --- | --- | --- | --- | --- | --- |
| PU | Diol | | Diol denoted by general formula (1) | | Chain-extending agent | Diisocyanate | |
| A | Polyether A | 22.7 | Diol obtained in Synthesis Example 1 | 2.1 | BPA-PO 26.3 | MDI | 48.9 |

| PU | Reaction catalyst | Sulfonic acid (salt) concentration eq/t | Mw | Mw/Mn | 50% cyclohexane solution after stirring at 60° C. for 1 h |
| --- | --- | --- | --- | --- | --- |
| A | Di-n-butyltin laurate | 67 | 70000 | 1.8 | Dissolved clearly |

Polyether A: Adduct-type bisphenol A in which 6 moles of propylene oxide are added(Molecular weight: 577)
BPA-PO: Adduct-type bisphenol A in which 2 moles of propylene oxide are added(Molecular weight: 344)
MDI: 4,4'diphenylmethane diisocyanate(Molecular weight: 250)

Examples 1 to 10

| Preparation of magnetic layer coating liquid | |
| --- | --- |
| Ferromagnetic powder (see Table 3) | 100 parts |
| Polyurethane resin UR8200 (sulfonic acid group-containing polyurethane resin) made by Toyobo Co., Ltd. or PU-A; see Table 3 | 12 parts |
| Vinyl chloride resin MR110 (sulfonic acid group-containing vinyl chloride resin) made by Nippon Zeon Co., Ltd | 6 parts |
| Sulfonic acid (salt) group-containing diol (see Table 3) | 3 parts |
| α-Al$_2$O$_3$ (particle size: 0.15 μm) | 2 parts |
| Carbon black (particle size: 40 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Ferromagnetic Powder (1) Acicular Ferromagnetic Powder
Composition: Fe 89 atomic %, Co 5 atomic %, Y 6 atomic %, Hc: 175 kA/m(2200 Oe), specific surface area: 70 m$^2$/g,

| Preparation of nonmagnetic layer coating liquid | |
| --- | --- |
| Carbon black (DBP oil absorption capacity: 120 ml/100 g, pH: 8, BET specific surface area: 250 m$^2$/g, volatile content: 1.5%) | 20 parts |
| Polyurethane resin UR8200 (sulfonic acid group-containing polyurethane resin) made by Toyobo Co., Ltd. | 12 parts |
| Vinyl chloride resin MR110 (sulfonic acid group-containing vinyl chloride resin) made by Nippon Zeon Co., Ltd | 6 parts |
| α-Al$_2$O$_3$ (mean particle diameter: 0.2 μm) | 1 part |
| Monobiphenyl phosphate | 3 parts |
| Cyclohexanone | 140 parts |
| Methyl Ethyl ketone | 170 parts |
| Butyl stearate | 2 parts |
| Stearic acid | 1 parts |

The various components of the above magnetic layer coating liquid and nonmagnetic layer coating liquid were separately kneaded for 60 minutes in open kneaders and dispersed for 120 minutes in sand mills. To the dispersion liquids obtained were added 6 parts of trifunctional low-molecular-weight polyisocyanate compound (Coronate 3041 made by Nippon Polyurethane Industry Co., Ltd.) and the mixtures were stirred for 20 minutes. The mixtures were then filtered with filters having a mean pore diameter of 1 micrometer to prepare a magnetic layer coating liquid and a nonmagnetic layer coating liquid.

Preparation of Magnetic Recording Medium

An adhesive layer in the form of sulfonic acid-containing polyester resin was coated to the surface of a polyethylene terephthalate support 7 micrometers in thickness with a coil bar in such a manner as to obtain a dry thickness of 0.1 micrometer.

Next, a 1.5 micrometer coating of the nonmagnetic layer coating liquid obtained, immediately followed by a coating of the magnetic layer coating liquid calculated to yield a thickness upon drying of 0.1 micrometer, were coated in a simultaneous multilayer coating with reverse rolls. The nonmagnetic support coated with the magnetic layer coating liquid was subjected to magnetic orientation with 0.5 T (5,000 Gauss) Co magnets and 0.4 T (4,000 Gauss) solenoid magnets while the magnetic layer coating liquid was still wet. The coated support was then calendered with a metal roll—metal roll—metal roll—metal roll—metal roll—metal roll—metal roll combination at a speed of 100 mlmin, a linear pressure of 300 kg/cm, and a temperature of 90° C., followed by thermoprocessing for 48 hours at 80° C., and then slit to a width of ½ inch to obtain a magnetic tape.

Comparative Example 1

With the exception that the compound denoted by general formula (1) was replaced in the magnetic layer by taurine (comparative compound) employed in Example of Japanese Unexamined Patent Publication (KOKAI) Heisei No. 5-62162, a magnetic tape was obtained by the same method as in Example 1.

Comparative Example 2

With the exception that the compound denoted by general formula (1) was replaced in the magnetic layer by monobiphenyl phosphate employed in Example of Japanese Unexamined Patent Publication (KOKAI) No. 2001-134922, a magnetic tape was obtained by the same method as in Example 1.

Measurement Methods (1) Smoothness

The number of 10 to 20 nm protrusions was determined by scanning an area 30×30 micrometers at a tunnel current of 10 nA and a bias current of 400 mV with a Nanoscopell made by Digital Instruments, and expressed as a relative value, with Comparative Example 1 being 100.

(2) Electromagnetic Characteristics

Measurements were made with a ½ inch linear system with a secured head. The head/tape relative speed was 10 m/s. A MIG head (track width 18 micrometers) with a saturation magnetization of 1.4 T was employed for recording. The recording current was set to the optimal current for each tape. An anisotropic MR (A-MR) head with an element thickness of 25 nm and a shield gap of 0.2 micrometer was employed as the reproduction head. A signal with a recording wavelength of 0.2 micrometer was recorded. The reproduced signal was frequency-analyzed with a spectrum analyzer made by Shibasoku. The ratio of the carrier signal (wavelength 0.2 micrometer) output to the integrated noise of the full spectrum was adopted as the S/N ratio and expressed as a relative value, with Comparative Example 1 being 0 dB.

(3) Repeat Sliding Durability

The tape was placed in an environment of 40° C. and 10 percent RH. The magnetic layer surface was brought into contact with a round rod of AlTiC, a load of 100 g (TI) was applied, the tape was caused to repeatedly slide at a speed of 2 m/s for 10,000 passes, and the damage to the tape upon completion was evaluated according to the following scale:

Excellent: Some scratching, but greater portion unscratched.

Good: Scratched portions exceeded unscratched portions.

Poor: Peeling of entire magnetic layer.

(4) Storage Property

Six hundred meters of tape were wound on the reels employed in an LTO-G3 cartridge and stored for two weeks at 60° C., 90 percent RH. The sliding durability of the tape following storage was then measured by the same method as in (3).

The results are given in Table 3.

TABLE 3

| | Compound added | Polyurethane | Ferromagnetic powder | | |
|---|---|---|---|---|---|
| | | | Type | Size | |
| Ex. 1 | Diol obtained in Synthesis Example 1 | UR8200 | Acicular ferromagnetic powder | Major axis length | 35 nm |
| Ex. 2 | Diol obtained in Synthesis Example 2 | UR8200 | Acicular ferromagnetic powder | Major axis length | 35 nm |
| Ex. 3 | Diol obtained in Synthesis Example 3 | UR8200 | Acicular ferromagnetic powder | Major axis length | 35 nm |
| Ex. 4 | Diol obtained in Synthesis Example 4 | UR8200 | Acicular ferromagnetic powder | Major axis length | 35 nm |
| Ex. 5 | Diol obtained in Synthesis Example 5 | UR8200 | Acicular ferromagnetic powder | Major axis length | 35 nm |
| Ex. 6 | Diol obtained in Synthesis Example 1 | PU-A | Acicular ferromagnetic powder | Major axis length | 35 nm |
| Ex. 7 | Diol obtained in Synthesis Example 1 | PU-A | Hexagonal plate-shaped ferrite powder | Plate diameter | 10 nm |
| Ex. 8 | Diol obtained in Synthesis Example 1 | PU-A | Hexagonal plate-shaped ferrite powder | Plate diameter | 50 nm |
| Ex. 9 | Diol obtained in Synthesis Example 1 | PU-A | Spherical iron nitride powder | Particle diameter | 10 nm |
| Ex. 10 | Diol obtained in Synthesis Example 1 | PU-A | Spherical iron nitride powder | Particle diameter | 50 nm |
| Comp. Ex. 1 | Comparative compound | UR8200 | Acicular ferromagnetic powder | Major axis length | 35 nm |

TABLE 3-continued

| | | | | Comp. Ex. 2 | Monobiphenyl phosphate | | UR8200 | Acicular ferromagnetic powder | Major axis length | 35 nm |

| | Smoothness | Electromagnetic characteristics | Repeat sliding durability | Storage property |
|---|---|---|---|---|
| Ex. 1 | 75 | 1.7 | Good | Good |
| Ex. 2 | 86 | 1.4 | Good | Good |
| Ex. 3 | 74 | 1.7 | Good | Good |
| Ex. 4 | 75 | 1.7 | Good | Good |
| Ex. 5 | 80 | 1.6 | Good | Good |
| Ex. 6 | 70 | 1.9 | Excellent | Excellent |
| Ex. 7 | 65 | 1.0 | Excellent | Excellent |
| Ex. 8 | 78 | 0.6 | Excellent | Excellent |
| Ex. 9 | 65 | 1.0 | Excellent | Excellent |
| Ex. 10 | 80 | 0.6 | Excellent | Excellent |
| Comp. Ex. 1 | 100 | 0.0 | Poor | Poor |
| Comp. Ex. 2 | 90 | 0.4 | Poor | Poor |

As shown in Table 3, the magnetic tapes of Examples 1 to 10 exhibited greater smoothness and better electromagnetic characteristics than the magnetic tapes of Comparative Examples 1 and 2. These results revealed that the addition of compounds S-1 to S-6 as magnetic layer components enabled good dispersion of microgranular magnetic powder of the size indicated in Table 3.

Further, the magnetic tapes of Examples 1 to 10 exhibited good repeat sliding durability, that is good running durability. The magnetic tapes of Examples 1 to 10 also exhibited good sliding durability after storage. This was attributed to the good storage property of the added compounds, which remained adsorbed to the surface of the magnetic powder in the magnetic layer for an extended period. In particular, Examples 6 to 10, in which polyurethane resin (PU-A) having the same structure as the added compound was employed as binder in the magnetic layer, exhibited excellent sliding durability and storage properties. High compatibility between the added compound and the polyurethane resin was thought to have improved the strength of the bond between polyurethane resin and magnetic powder.

These results reveal that the addition of the compound denoted by general formula (1) to the magnetic layer increased the surface smoothness and enhanced the electromagnetic characteristics of the magnetic layer. The repeat sliding durability and durability after storage also improved.

The magnetic recording medium of the present invention is suitable as a magnetic recording medium for high-density recording, such as a backup tape, for which high durability and reliability are demanded over extended periods.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A magnetic recording medium comprising a magnetic layer comprising a ferromagnetic powder and a binder on a nonmagnetic support, wherein the magnetic layer comprises a compound selected from the group consisting of compounds (S-2) to (S-18), (S-20) to (S-27), (S-30) to (S-33) and (S-34) to (S-37):

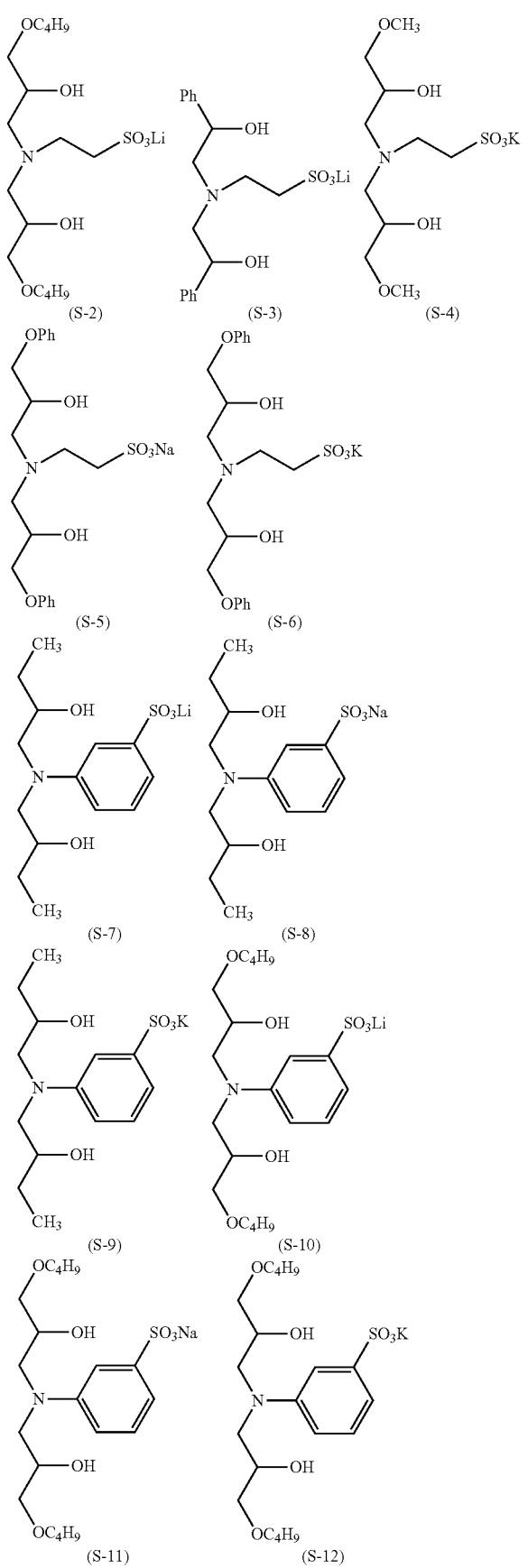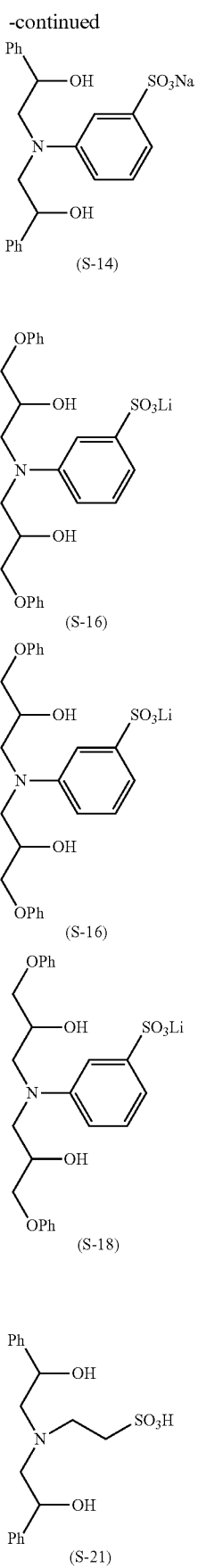

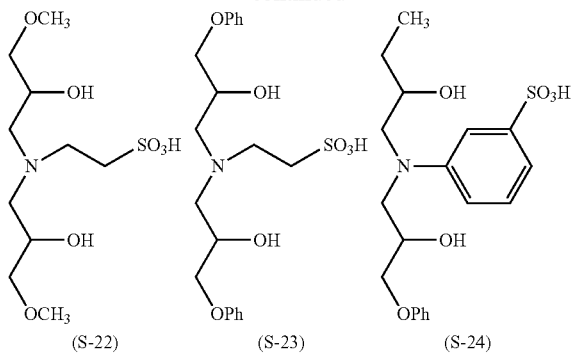

(S-22) (S-23) (S-24)

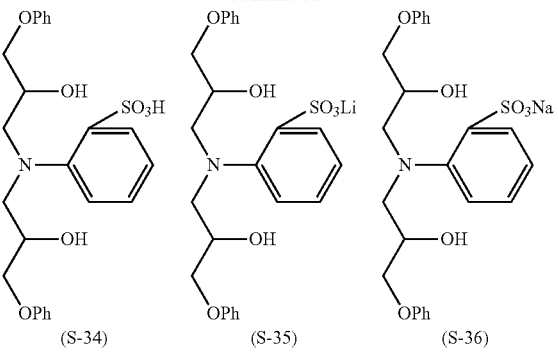

(S-34) (S-35) (S-36)

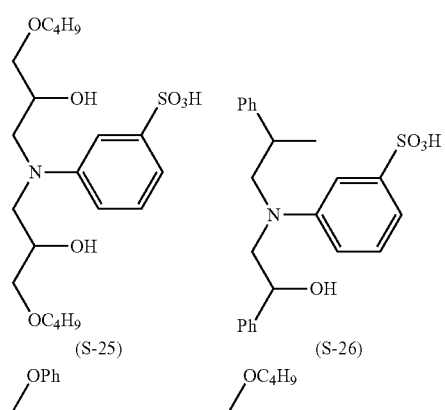

(S-25) (S-26)

(S-37)

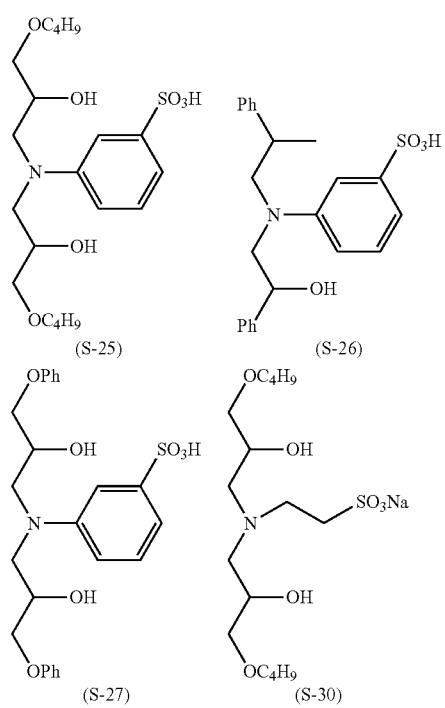

(S-27) (S-30)

(S-31) (S-32)

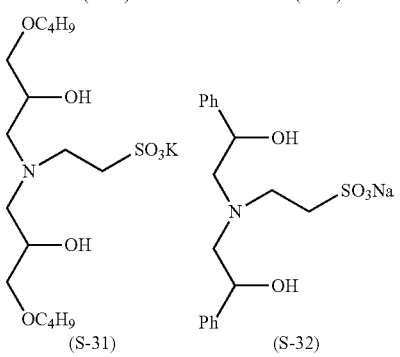

(S-33)

wherein the magnetic layer further comprises a reaction product of the compound selected from the group consisting of compounds (S-2) to (S-18), (S-20) to (S-27), (S-30) to (S-33) and (S-34) to (S-37) with an isocyanate compound.

2. The magnetic recording medium according to claim 1, wherein the binder comprised in the magnetic layer comprises a polyurethane resin formed with a diol component in the form of the compound denoted by general formula (1).

3. The magnetic recording medium according to claim 1, wherein the magnetic layer comprises 0.1 to 30 weight parts of the compound denoted by general formula (1) per 100 weight parts of the ferromagnetic powder.

4. A magnetic coating material comprising a magnetic powder, a binder, an isocyanate compound, and a compound selected from the group consisting of compounds (S-2) to (S-18), (S-20) to (S-27), (S-30) to (S-33) and (S-34) to (S-37):

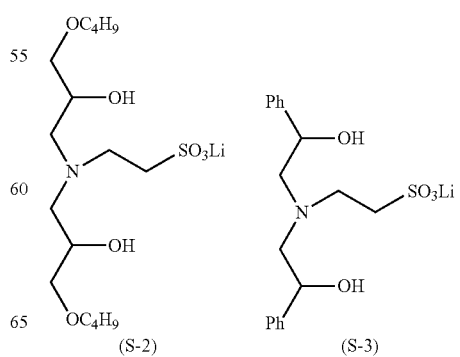

(S-2) (S-3)

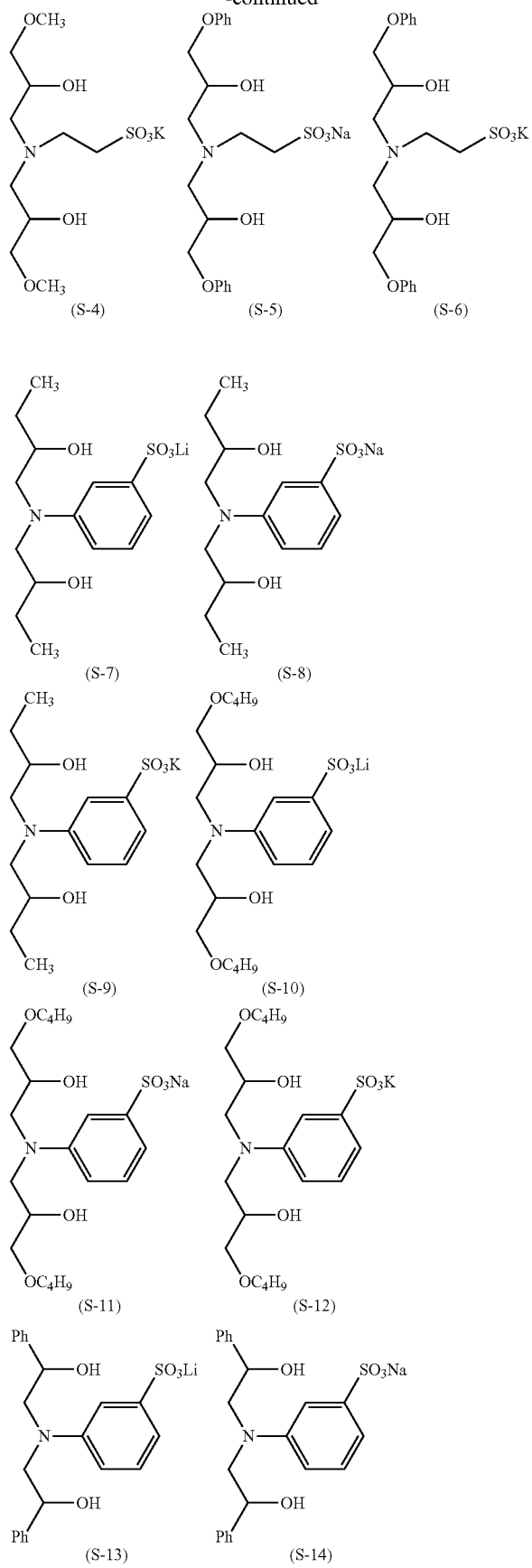
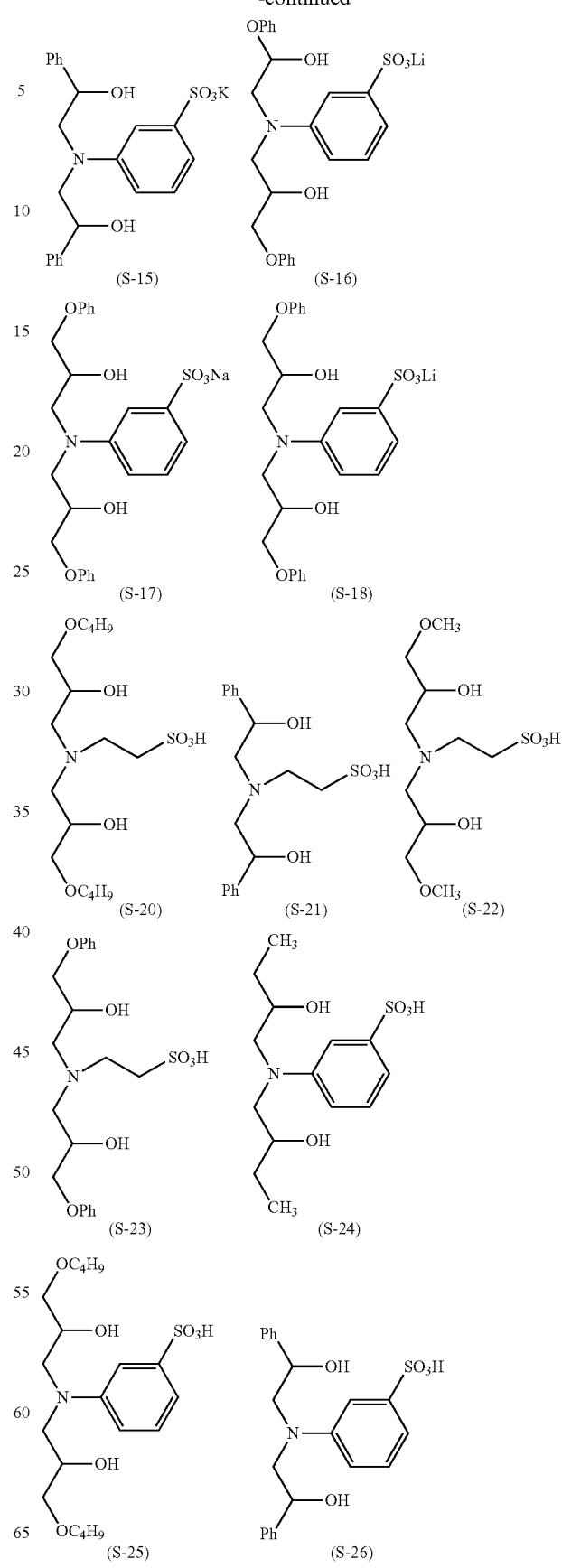

-continued
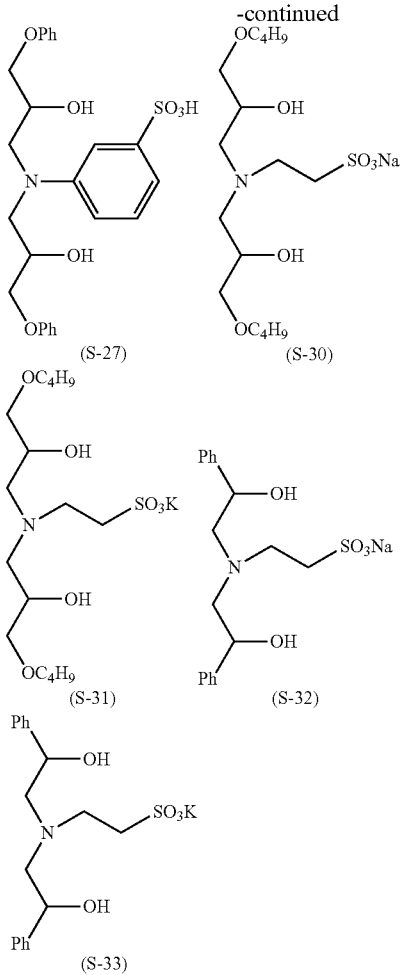
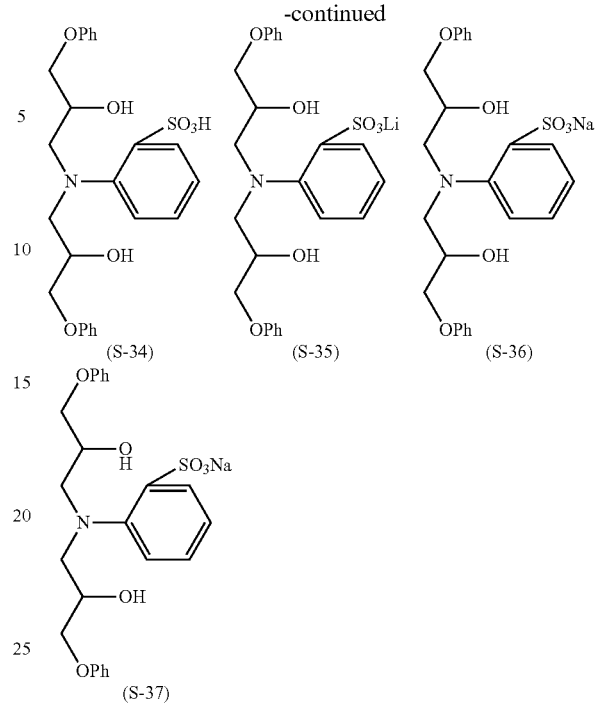
5. The magnetic coating material according to claim 4, wherein the binder comprises a polyurethane resin formed with a diol component in the form of the compound denoted by general formula (1).
6. The magnetic coating material according to claim 4, which is a coating liquid for forming a magnetic layer of a magnetic recording medium.
* * * * *